(12) United States Patent
Webb, Sr.

(10) Patent No.: US 7,755,479 B2
(45) Date of Patent: *Jul. 13, 2010

(54) GLOBAL INTELLIGENT REMOTE DETECTION SYSTEM

(75) Inventor: Gregory E. Webb, Sr., Arlington Heights, IL (US)

(73) Assignee: InfrAegis, Inc., Elk Grove Village, IL (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/321,376

(22) Filed: Dec. 29, 2005

(65) Prior Publication Data

US 2007/0164858 A1    Jul. 19, 2007

Related U.S. Application Data

(63) Continuation of application No. 10/464,523, filed on Jun. 17, 2003, now Pat. No. 7,012,520.

(51) Int. Cl.
    *G08B 1/08* (2006.01)
(52) U.S. Cl. .............................. 340/539.13; 340/568.1; 340/426.19; 340/825.36
(58) Field of Classification Search ............ 340/539.13, 340/539.11, 539.1, 531, 568.1, 539.26, 988, 340/572.1, 539.22, 541, 426.19, 572.4, 825.49, 340/825.36
See application file for complete search history.

(56) References Cited

U.S. PATENT DOCUMENTS 4,688,244 A * 8/1987 Hannon et al. ................. 377/58
5,615,247 A * 3/1997 Mills ........................... 455/411
5,724,425 A    3/1998 Chang et al.
5,917,433 A * 6/1999 Keillor et al. ................ 340/989
6,529,141 B1 * 3/2003 Hanebeck et al. ........... 340/988
6,658,091 B1 * 12/2003 Naidoo et al. .................. 379/37
6,717,517 B2    4/2004 Przygoda, Jr.
6,748,325 B1    6/2004 Fujisaki
6,816,090 B2 * 11/2004 Teckchandani et al. ...... 340/989
6,826,514 B1 * 11/2004 Antico et al. ................ 702/188
6,973,385 B2 * 12/2005 Ulrich ......................... 701/207
6,995,669 B2 * 2/2006 Morales .................. 340/539.31
2003/0206100 A1 * 11/2003 Richman et al. ............. 340/506
2004/0041706 A1 * 3/2004 Stratmoen et al. ....... 340/539.26

* cited by examiner

*Primary Examiner*—Daniel Previl
(74) *Attorney, Agent, or Firm*—McDermott Will & Emery LLP

(57) ABSTRACT

A security system and method for monitoring a security status of fixed and mobile assets. The security system comprises an agent connected with the asset. The agent includes a receiver for receiving; a sensing device for monitoring a security of the asset; a processor for compiling the security data to generate a security status; and a wireless transceiver for transmitting data to a master control unit. The master control unit retransmits the security status to an global operations center for processing the security status to detect a security threat. In response to a security threat, the global operations center initiates and action or counter measure. For mobile assets the security system also tracks a location of the asset as the is transported between a shipper's loading dock and a designated distribution center, including an origination port and a destination port. For fixed agents, the security system includes an interface for interfacing an existing security device to the master control unit.

70 Claims, 19 Drawing Sheets

GLOBAL INTELLIGENT REMOTE DETECTION SYSTEM

This application is a continuation of and claims priority to U.S. patent application Ser. No. 10/464,523, filed Jun. 17, 2003 now U.S. Pat. No. 7,012,520, incorporated herein by reference.

BACKGROUND OF THE INVENTION

1. Field of the Invention

The invention relates to a global system for detection of security breaches in shipments, and more particularly to a system for tracking containers during transport.

2. Statement of the Problem

Since the September 11 catastrophe, security has become a major concern, wherein, requests to more actively track the whereabouts of trucks and other assets have been overwhelming. One area of concern is the physical security of public locations, including enterprises, campuses and other public buildings. Conventional physical security measures such as intrusion detection, CCTV surveillance, metal detection, perimeter security using bollards, and protection of building air intakes are often the first line of defense against terrorism, for high-threat, high vulnerability infrastructures. These methods are often supplemented with operational procedures to mitigate an attack, including pre-planned evacuation strategies. Such measures, however, are not sufficient to counter unconventional threats such as dirty bombs, and chemical and biological weapons of mass destruction.

Another area of concern is cargo being tampered with or dangerous packages being implanted onto transporting vehicles. In the recently introduced Customs-Trade Partnership Against Terrorism (C-TPAT)—a join initiative between US Government and the industry, importers take prominent steps to assess, evolve and communicate tighter security practices for cargo. This allows shippers to receive expedited processing across the US borders.

Documentation has not traditionally been an important part of getting cargo out of a foreign port. Under the new 24-hour rule, US Customs requires that it be notified 24 hours before the ship sails with cargo bound for the US. In other words, the new rule requires advance submission of the cargo manifest. Prior to the new rule, the shipper made a booking with the shipping line which reserved equipment and space on the ship. For the most part, this was done by telephone or fax, although there is now steady growth in bookings being made online.

The next step was for the shipper to issue Shipping instructions. The shipping instructions provide a more detailed description of the cargo to be shipped, origin and destination addresses and details of the shipper and consignee. This is the information, collected from many shippers, that is used to create the cargo manifest.

The timescale for the process has been very variable. Bookings may have been made a month ahead or 2 days before the vessel sails and the complete shipping instructions were sometimes not received until after the vessel sailed. Delayed information is inconvenient for the shipper but, in general, as long as the manifest was completed ahead of the arrival at the destination port, it was not a problem.

However, US Customs has implemented new rules on the advance submission of cargo manifests in the trades to the US. The new rule is stated by the US Customs: "For any vessel . . . except for any vessel exclusively carrying bulk or break bulk cargo, Customs must receive from the carrier vessel, the vessel's Cargo Declaration, or an electronic equivalent, 24 hours before such cargo is laden aboard the vessel at the foreign port."

The four core elements of the US Customs Container Security Initiative focuses specifically on container traffic and aims to screen inbound containers before they reach the United States. The four core elements of CSI are: establishing security criteria to identify high-risk containers; catching high-risk containers before they arrive at US ports; using technology to quickly prescreen or inspect high-risk containers; and developing and using smart and secure containers.

Failure to provide complete and timely documentation results in cargo that carriers will not load or that US Customs will not permit to unload. Importers need to make sure that their suppliers and logistics providers comply with the regulations, or risk having cargo stranded at the origin, or, even worse, on an inbound vessel that cannot be unloaded.

For now, the new rule applies to US-inbound cargo only. However, the industry can expect equivalent rulings from other jurisdictions worldwide in response to terrorist and other security threats. Portals, such as GTN, currently offer the most efficient means to link all of the parties, provide a central data depository and to generate key alerts.

Tracking systems of different kinds such as those based on transponders, electronic tags, or radio tags RFID (radio frequency identification) mounted on containers or carriers are known in the art. To track a vehicle, the vehicle positions over a period of time need to be known. The Global Positioning System (GPS) is a popular means to determine the position of a vehicle having a GPS receiver. GPS can determine the position of a vehicle which is on land, at sea, or in the air. The GPS information is typically communicated to positional software embedded in a GPS receiver.

Many shipping companies attach transmitting devices to shipping containers to track their geographic location. This allows the shipping company to determine the geographic location of the container as it moves between the origination and destination points to determine whether the goods inside the container are on time, late, or somehow misplaced. For instance, the container may have been misrouted or been placed on the incorrect transportation vehicle to reach its destination. Tracking of containers in transit is well developed, including the use of satellites and other electronic technology to obtain real-time data on in transit locations.

The tracking devices associated with the container rely on the transmission and reception of various types of communication signals, such as electromagnetic and/or radio frequency signals, for determining the geographic position. A problem occurs when the container with the tracking device is loaded onto a transportation vessel, such as a ship, wherein containers are loaded into areas of the vessel which obstruct the signals. The user is left to track the vehicle rather than the container and trust that the container did indeed get loaded onto the vessel. While out-of-range, the tracking system is essentially deactivated since it is unable to communicate with the control station.

Other known security systems include alarm systems that secure the contents of trailers/fleets from origination to destination. Local alarm systems serve as theft deterrent by sending tamper detection alerts. An attempt to tamper with the doors of the trailer results in the system sending an alarm to a pager carried by the drivers (allows detection only with a specific range). The system also tracks events history such as door openings. Widespread usage of alarm systems is seen among small and medium sized fleets.

A radio-frequency device that transmits shipping data as it passes a reader device and indicates whether the container to which it is attached has been tampered with is the "e-seal". The e-seal consists of a bolt that locks the container when inserted into the seal body and serves as an antenna. The seal body contains a microchip for encoding the information and transmitting that information when queried by a reader. However, the container to which it is attached is required to be within range of the reader for transmission. Therefore, the data is not updated while the container is in transit between an origination and a destination. Another problem with the e-seal is that e-seals have limited signal strength and must be read at line-of-sight distances that do not exceed 70 feet. This makes it difficult to read these particular seals in marine terminals or the holds of ships where containers are stacked in close proximity or where the signals may be blocked.

Another problem is detecting cargo that poses a radiation threat. The three primary methods of detecting radiation threats in cargo containers are (a) manual inspection, (b) remote inspection and (c) in-container detection. The shortcomings of manual inspection are obvious. Remote inspection involves scanning a container with penetrating radiation as is done for luggage screening at airports. An important difference, however, is that airport scanners use low intensity x-rays whereas cargo containers use high-intensity, high-energy gamma-rays owing to the size and metal construction of the containers. Use of high-intensity, high-energy gamma rays is potentially harmful to humans, relies on a human observer to identify a radiation threat, requires a change in the unloading procedures which may result in delays, and does not provide offshore protection.

For these reasons, under the new 24-hour rule, there is a need for a reliable tracking system that provides the customer with a comprehensive security status of the container during transit.

SUMMARY OF THE INVENTION

The present invention advances the art and helps overcome the aforementioned problems by providing a security system for tracking a security status of assets. The security system comprises an agent having a sensing device for monitoring a security of the asset; a processor for compiling the security data to generate a security status; and a transceiver for transmitting data from and receiving data to the agent. The security system also includes a master control unit that receives and compiles the security status from the agent and retransmits the compiled security status to a global operations center for processing to detect a security threat. In response to a threat, the global operations center initiates an action or countermeasure.

The sensing device may include an environmental sensor for monitoring an ambient air within the asset to detect the security threat and a chemical or biological detector for detecting a chemical or biological matter therein. The agent may also include a radiation detector for detecting a radioactive material within the container, a door position-sensing device for sensing a position of an access door connected with the asset, a light sensing device within said asset for sensing a luminescence level within the asset; and a video recording device for recording at least one of an interior of the asset or an exterior area surrounding the asset.

Since one or more of the assets may be loaded into an area out-of-range of the master control unit, the agent may include an intranet module for communicating between a plurality of wireless agents via a virtual network.

The assets may be mobile assets being transported over a predetermined route between a shipper's loading dock and a designated distribution center, the predetermined route include an origination port and a destination port. The agent may include a receiving device for receiving a location data, wherein the location data is transmitted to the master control unit with the security status. The security system may also include a loading master control unit for inventorying the cargo loaded into the asset at the shipper's loading dock and creating a manifest which is uploaded from the loading master control unit to the agent and the global operations center. The loading master control includes a scanner for automatically inventorying the cargo as the cargo is loaded into the asset and a receiver for receiving a location data, wherein the master control unit transmits the location data to the global operations center with the security status.

The security system includes an origination port master control unit for receiving the manifest and the security status from the agent prior to arrival of the container at the origination port and a destination master control unit at the destination port, wherein the onboard master control unit notifies the destination master control unit which container it is carrying and uploads the manifest and the security status to the port master control unit as the container is approaching the destination port.

The security system also monitors the security of fixed assets wherein the system further includes an output device for responding to the detected security threat following a threat response process. The output device may control the operation of one or more of a door, a lighting system, a ventilation system, a power distribution system, and a computer system. The security system includes an interface for interfacing an existing security device to the master control unit.

The above and other advantages of the present invention may be better understood from a reading of the following description of the preferred embodiments of the invention taken in conjunction with the drawings in which:

DETAILED DESCRIPTION OF THE PREFERRED EMBODIMENT

In this disclosure, the term "agent" refers to a self-powered electrical or electromechanical sensing and communicating device for monitoring a physical location and a security status of a cargo container, also referred to as a communicating intelagent agent (CIA), a pallet trakker, or a fixed intelagent agent (FIA) depending on the usage of the agent. When used as an agent for monitoring a security status of a fixed asset, the agent is referred to as an FIA. Agents attached to commercial and military mobile containers are referred to as CIAs and pallet trakkers, respectively. Each of the FIA, CIA, and pallet trakker have security monitoring features and may include alternative configurations.

The term "asset" refers to the mobile asset or fixed asset that is being monitored. The mobile asset may be a container, pallet or an individual traveling between an origination and a destination. A fixed asset may include buildings, enterprise, campus, city surveillance, transportation hub, power station or substation, or a nuclear power plant.

Figure 1:
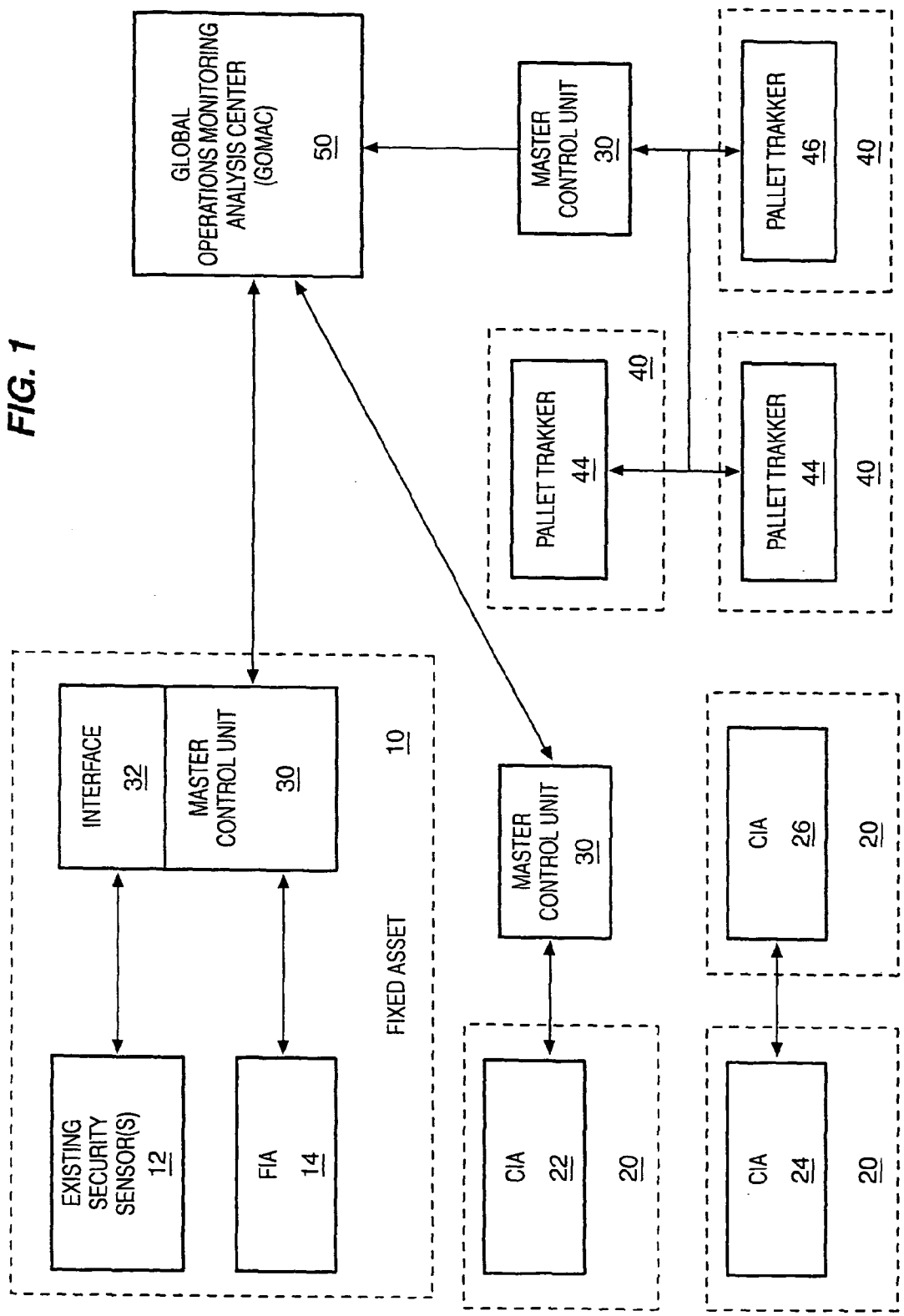
FIG. 1 is a block diagram of a centralized monitoring and knowledge system according to the present invention.

The present security system provides both wired and wireless devices and services for the protection of fixed and mobile assets against theft, tampering or terrorist attacks using nuclear, chemical or biological materials. The security system addresses three market segments, commercial mobile assets, military mobile assets and fixed assets. FIG. 1 is a block diagram of the global intelligent remote detection system of the present invention. The system includes an global operations monitoring analysis center (GOMAC) 50, master control units (MCUs) 30 in communication with the GOMAC 50 and a plurality of agents 12-14, 22-28 and 4246. The system provides cross application management and execution of policy, threat detection, alarms, automatic notifications and automatic counter measures on an event driven basis. Communication between the agents, agents and the MCU and between the MCU and the GOMAC is encrypted and may also be compressed.

The mobile assets may be cargo containers 20, pallets 40 or an individual being transported domestically or internationally. When the cargo is commercial, a communicating intelligent agent (CIA) 22-28 is connected with the container for monitoring the security and position of the container. The security status and position of mobile military assets is monitored by attaching a pallet trakker 42-46 to each one of the pallets. The CIAs and/or pallet trakkers are in communication with other CIAs and/or pallet trakkers within range and with the master control unit 30 for sending the security status and position data to the GOMAC 50. During transit, the CIAs 22-28 and pallet trakkers 42-46 monitor the physical security of the container to detect occurrences such as tampering with the container and to detect a chemical, biological and nuclear material therein.

The fixed asset 10 may be a building, enterprise, campus environment or a key public access point. The fixed asset 10 may include an existing security system 12 and one of more FIAs 12, 14. The output of the existing security system 12 may be interfaced 32 with the master control unit 30 with additional security provided by installing FIAs 14 within the fixed asset 10. The communication channel between the existing security sensors 12 and the master control unit and the FIAs may be wired or the communication between an FIA and the master control unit may be wireless. The FIAs may also create an intranet for communication between the FIAs so that an FIA that is not within range of the master control unit may transmit the security status to an FIA within range.

Figure 2:
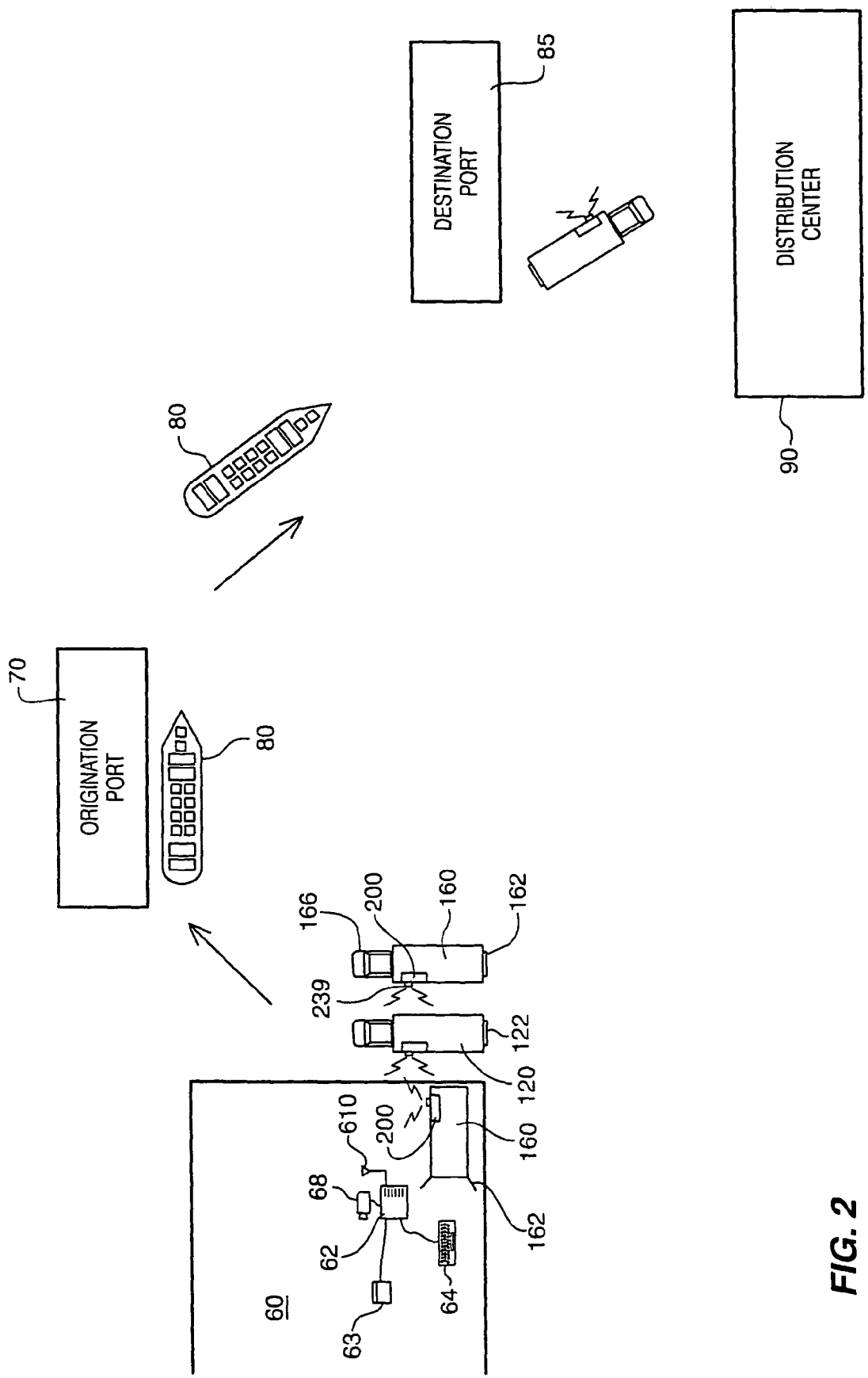
FIG. 2 is a block diagram of a centralized monitoring and knowledge system according to the present invention for monitoring mobile assets.

Mobile Assets The present system and method for providing centralized monitoring and knowledge management services allows a shipper to comply with the new US Custom's 24-hour rule and allows the military to track cargo during transit and after the container has been dropped by parachute. FIG. 2 illustrates the system from loading the commercial or military containers 160 at the shipper's loading dock 60, transporting the containers to an origination port 70, and tracking the containers en-route to a destination port 85 and on to a designated destination 90. At the shipper's loading dock, the cargo is inventoried as the cargo is loaded into the container. The inventory may be performed by entering data into a loading dock master control unit 62, either via a bar code reader 63, a keyboard 64, via a wireless RFID (radio frequency identification) card system using an antenna 66, or via video 67, or a combination of the above. A wireless agent 200 is connected with the container for monitoring the container during transport. When the agent is installed, antennas 239 are inserted through a hole or RF window in the container to the outside to minimize shielding from the metal container. The agent may be enclosed in a hardened casting which is magnetized for quick installation in the metal container. A security lock and sensor 122 is installed on the container door, and then the container is transported to an origination port 70 where the container is loaded onto a vessel 80 or other transport vehicle along with a plurality of other containers. The vessel transports the plurality of containers to a destination port 85.

A supply of agents may be kept by the shipper under the supervision of an individual that is a cleared, trained and bonded shipper employee, thereby maintaining the secure channel for distribution of agents. After installing the agent 200, the shipper employee activates the agent and the loading dock master control unit 62 and the global operations center are notified that the agent is on line. A signal transmitted from the agent through the loading dock master control unit 62 at the shipper's loading dock 60 provides a starting origination location.

Figure 3:
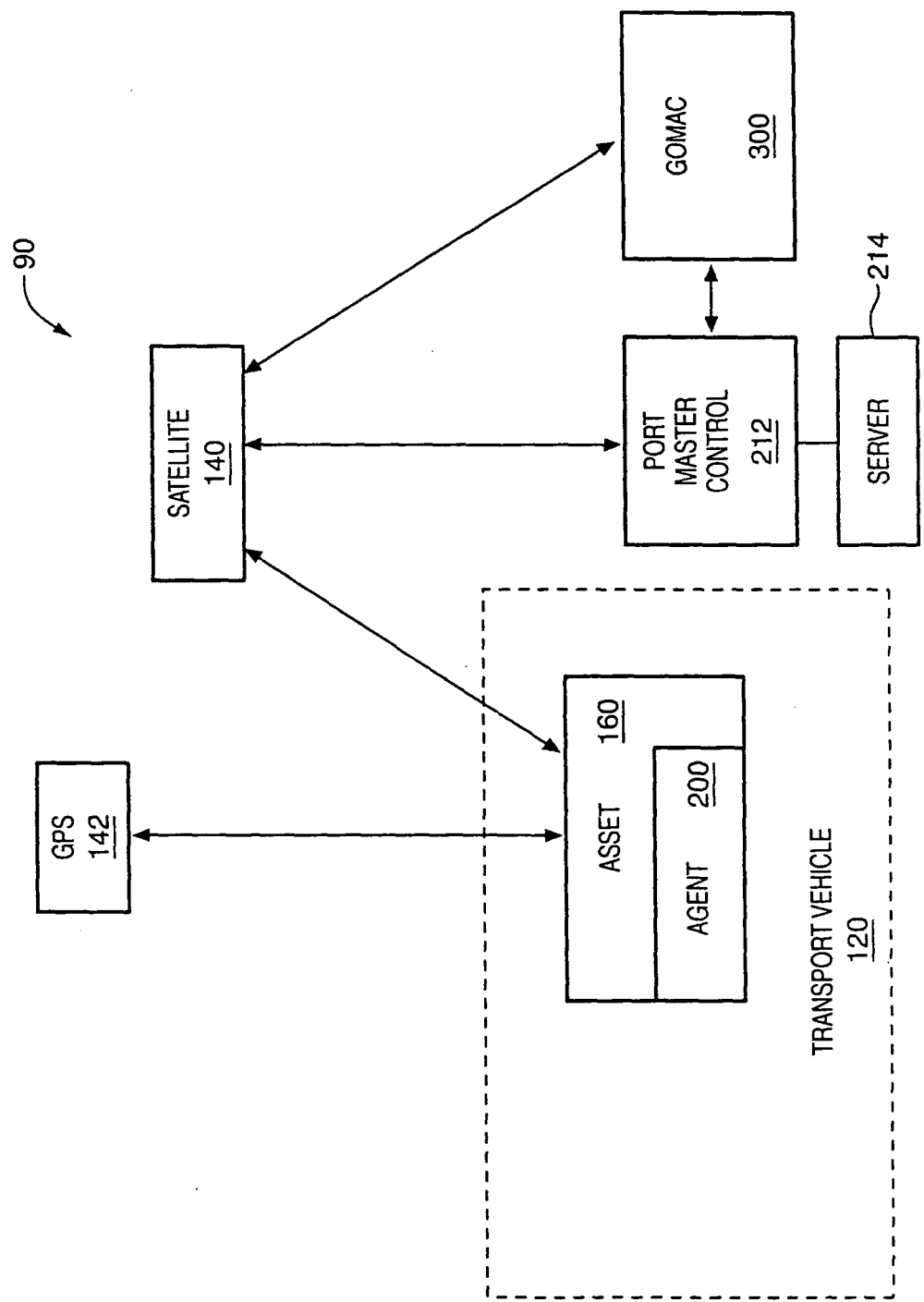
FIG. 3 is a block diagram of another embodiment of the centralized monitoring and knowledge system according to the present invention.

FIG. 3 illustrates a block diagram of a centralized monitoring and knowledge system 90 according to an embodiment of the present invention. A wireless agent 200 connected with the container 160 wirelessly communicates positional and security status data with the master control unit 212, preferable located at a shipping port 70, 85 via a communication satellite 140. The agent 200 may receive position data from a guidance system such as the global position satellite (GPS) 142 or an inertial guidance system and also monitors the security status of the physical condition of the container during transport between the shipper's loading dock 60, the origination port 70, the destination port 85, and the designated destination 90.

The loading dock, origination port and destination port may be equipped with a master control unit 212 for receiving and transmitting data from and to the agent 200 connected with the containers 160. The security status data and GPS position data are retransmitted from the port master control unit 212 to a local server 214 for storage and to the GOMAC 300 within the designated area of the master control unit. At the GOMAC 300, the received security data and GPS position data are stored for monitoring and analyzing the received data, generating reports and escalating potential security threat conditions to the appropriate individual or agency.

Figure 4:
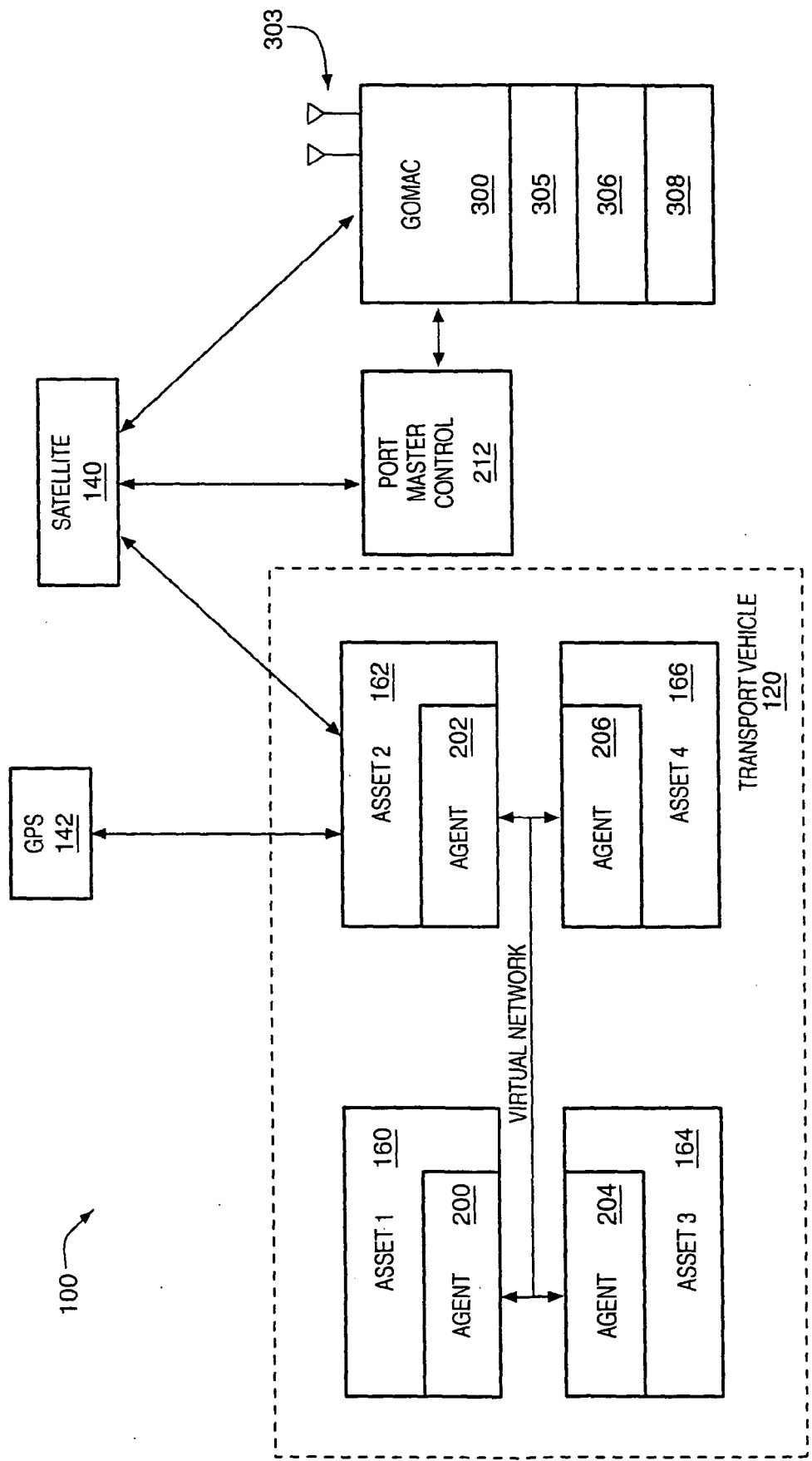
FIG. 4 is another block diagram of yet another embodiment of the centralized monitoring and knowledge system according to the present invention.

A plurality of containers may be transported in a transport vehicle 120 with agents 200-206 connected with each of the containers 160-166 as illustrated in FIG. 4. One or more of the plurality of containers 160-166 may be located out-of-range of the communication satellite 140 and/or the GPS satellite 142. In this embodiment, a one of the agent 200-206 within range of the communication satellite 140 is assigned as a primary agent to communicate with the GOMAC or with an onboard master control unit 210 (FIG. 4), if available. The primary agent may also receive the GPS position data or another one of the agent may receive the GPS position data and relay the GPS position data to the primary agent, agent 202 in this example.

Figure 5:
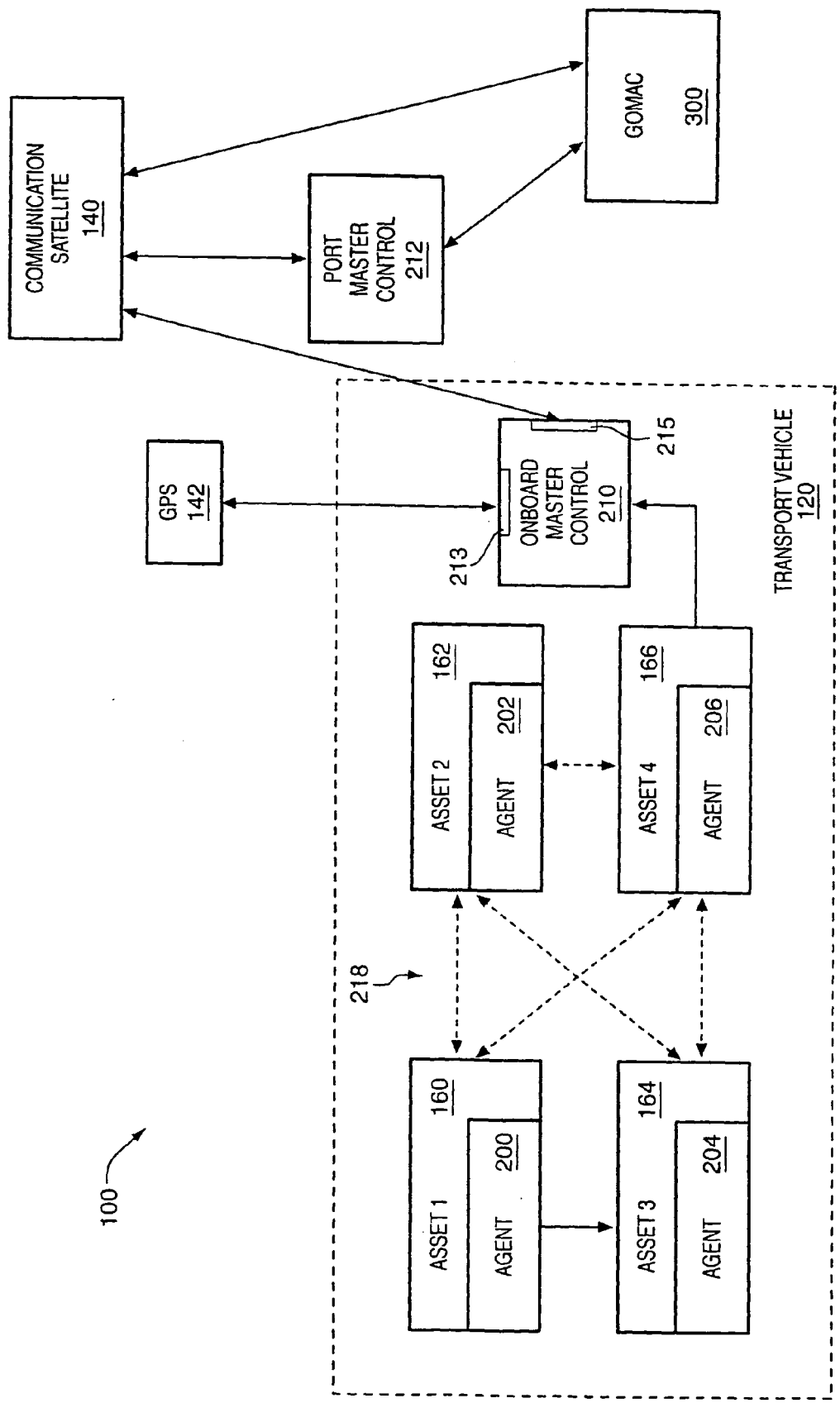
FIG. 5 is a block diagram of another embodiment of the centralized monitoring and knowledge system according to the present invention.

When the transport vehicle 120 is a trusted transport vehicle, an onboard communication system may be used to collect security status data from the agent as illustrated in FIG. 5. In this embodiment, the security status data may be transmitted via the onboard wireless communication system, as indicated by lines 218, to an onboard master control unit 210. The onboard master control unit 210 may include a guidance system such as GPS receiver for receiving the GPS position data or an inertial or other commercial guidance system. Once the GPS position data and the security status data for the plurality of agents have been updated, the updated data is wirelessly transmitted to the port master control unit 212 within the designated area or may be stored and transmitted later.

The pallet trakkers provide a means to remotely locate containers around the world and to monitor the unmanned containers to detect whether the container has been tampered with before military personnel arrive to use the cargo within the containers. The pallet trakker, like the CIA, monitors the security status of the pallet and cargo to which it is attached. While the pallet is being loaded, the inventory information may be uploaded to the pallet trakker. The pallet trakker includes software for executing an encryption algorithm for encrypting data for transmission between pallet trakkers and to the master control unit or the GOMAC. The pallet trakker securely communicates exception reports, and detected threats if detectors connected with the pallet trakker sense a possible violation to the health or integrity of the cargo. The communication between the pallet trakker or the master control unit and the GOMAC may be via a secure channel such as wireless communication via the INMARSAT, iridium or other secure satellite.

Fixed Assets

Figure 6:
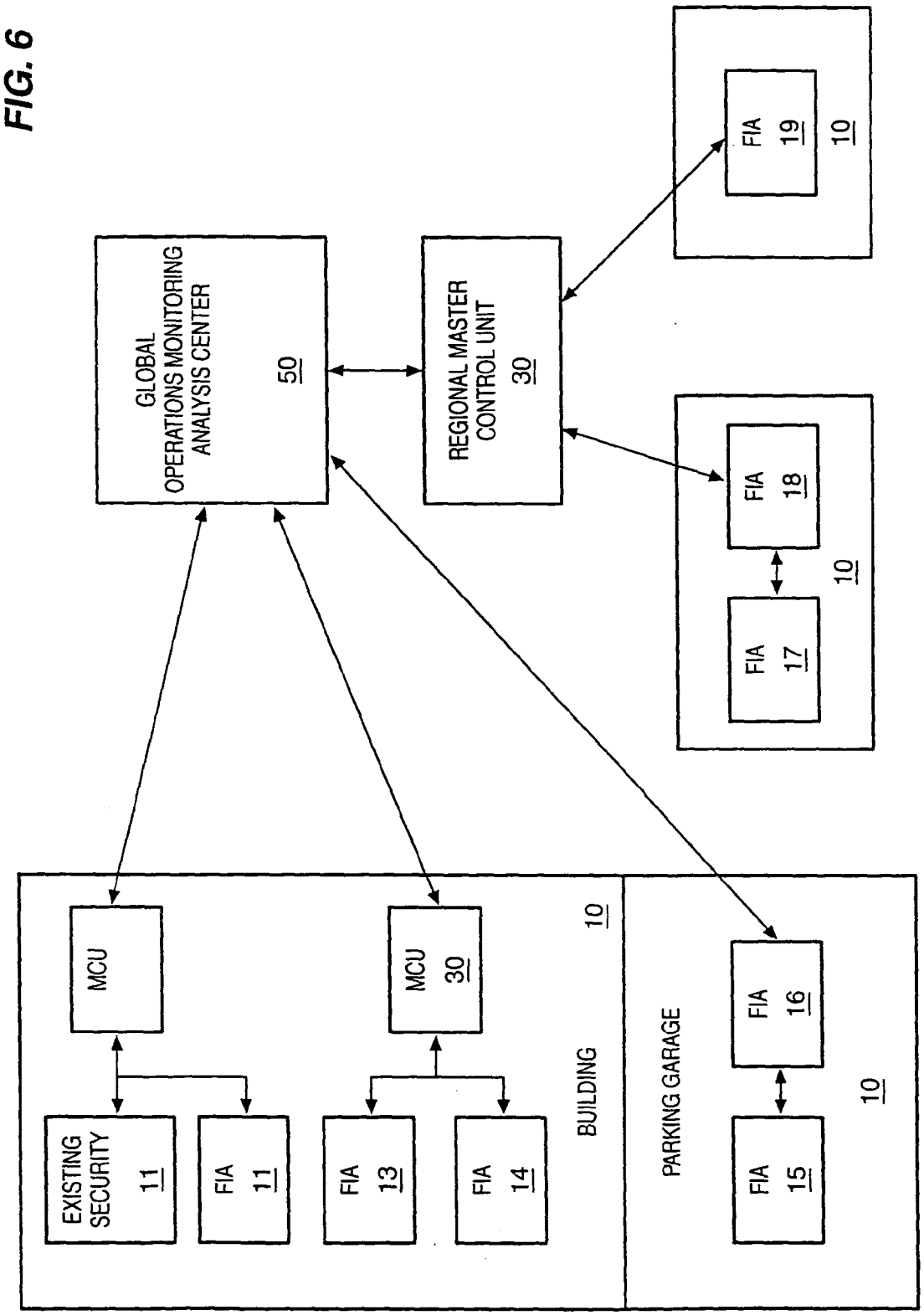
FIG. 6 is a block diagram of a centralized monitoring and knowledge system according to the present invention for monitoring fixed assets.

The present security system provides a comprehensive suite of fixed asset security options. The options may be used to provide security in a building, an enterprise or a designated public access area in a city, a nuclear power plant or a power substation environment. A single security system is used to provide an integrated system for facilities that have existing security systems. FIG. 6 illustrates a block diagram in which the existing security equipment 12 interfaces with the master control unit 30 for a comprehensive security system.

Existing security systems may include entrance door security 72, emergency lighting system 74 and video surveillance 76, to name a few. The present global security system provides an interface 70 for transmitting signals between the master control unit 30 and the existing security devices 72-76. A plurality of FIAs may also be installed in areas around the building. The assets being monitored by an FIA may be offices, lobby or other public area, a parking garage or the outer perimeter of the building, or other areas within the building or in close proximity to the building. The installation may include hard wired communication channels for communicating security status with the master control unit under normal operating conditions and may also include wireless communication channels for emergency usage.

The facility may have existing security processes and procedures for responding to detected threats. The global intelligent detection system of the present invention may be programmed to automatically initiate actions and classified and non-classified counter measures following existing or modified processes. The responses maybe as simple as sending an alarm to a guard or control center to initiate verification and further action. The detected threat may also trigger more direct actions from the GOMAC such as bolting of certain doors in the building. Under predetermined circumstances, many actions may be automatically initiated simultaneously, eliminating the delays and errors that can occur when human intervention is a mitigating factor. The response may also be to send an alarm or a notification to an appropriate official or agency.

The plurality of FIAs may monitor environmental conditions including the detection of a chemical, biological, or nuclear material within range of the particular FIA. Real-time video monitoring can sense when an object is introduced into an area and has been left unattended. This may automatically trigger the tracking, from camera to camera, of any individual that was within the area during the time period in which the object was introduced.

In another embodiment, FIAs are installed in subways, parking garages, both underground and freestanding, marinas shopping centers, power generation facilities or substations, or other public locations. Once installed, the FIAs maintain constant communication with the GOMAC and/or a local master control unit. The FIA, like the CIA and the pallet trakker previously discussed, includes an interface for receiving input from a variety of environmental sensors including radiation, chemical, biological and explosive detectors, speech recognition modules, as well as video sources.

The FIA includes a processor and memory for executing software to detect a threat and to respond to the threat. The FIA may also store security status data and download the security status to the GOMAC or local master control unit at predetermined intervals. When a threat is detected, the FIA may respond with a notification to the GOMAC or master control unit or by initiating a response. In response to threat detection from one or more FIAs, the GOMAC automatically notifies relevant agencies so that specified teams can take immediate action to evacuate the area or eliminate potentially dangerous situations base on the circumstances of the detected threat.

For example, the present global intelligent detection system includes advanced security measures such as radiation perimeter control in which radiation detectors are deployed several feet from the building perimeter to detect and simultaneously focus high-speed digital signal processor camera system on potential terrorists. For a radiation detection breach, cameras focus on the individual. One option would be to have the security guard detain the person or a more detailed evaluation with more accurate instrumentation may be requested. A more automated procedure may be adapted wherein centralized technical support is used. When a potential threat is detected by one or more sensors and verified by a scientist at the GOMAC, operational planning automatically determines whether that breach requires a low-level response, such as detaining an individual for questioning) or a high-level response. If a high-level response is required, then a series of countermeasures can be simultaneously executed, including all doors closed and locked immediately, appropriate state, federal and other officials notified immediately, as well as other physical responses to resolve the breach.

Agent

Communication Intelligence Agent (CIA)/Pallet Trakker

Figure 7:
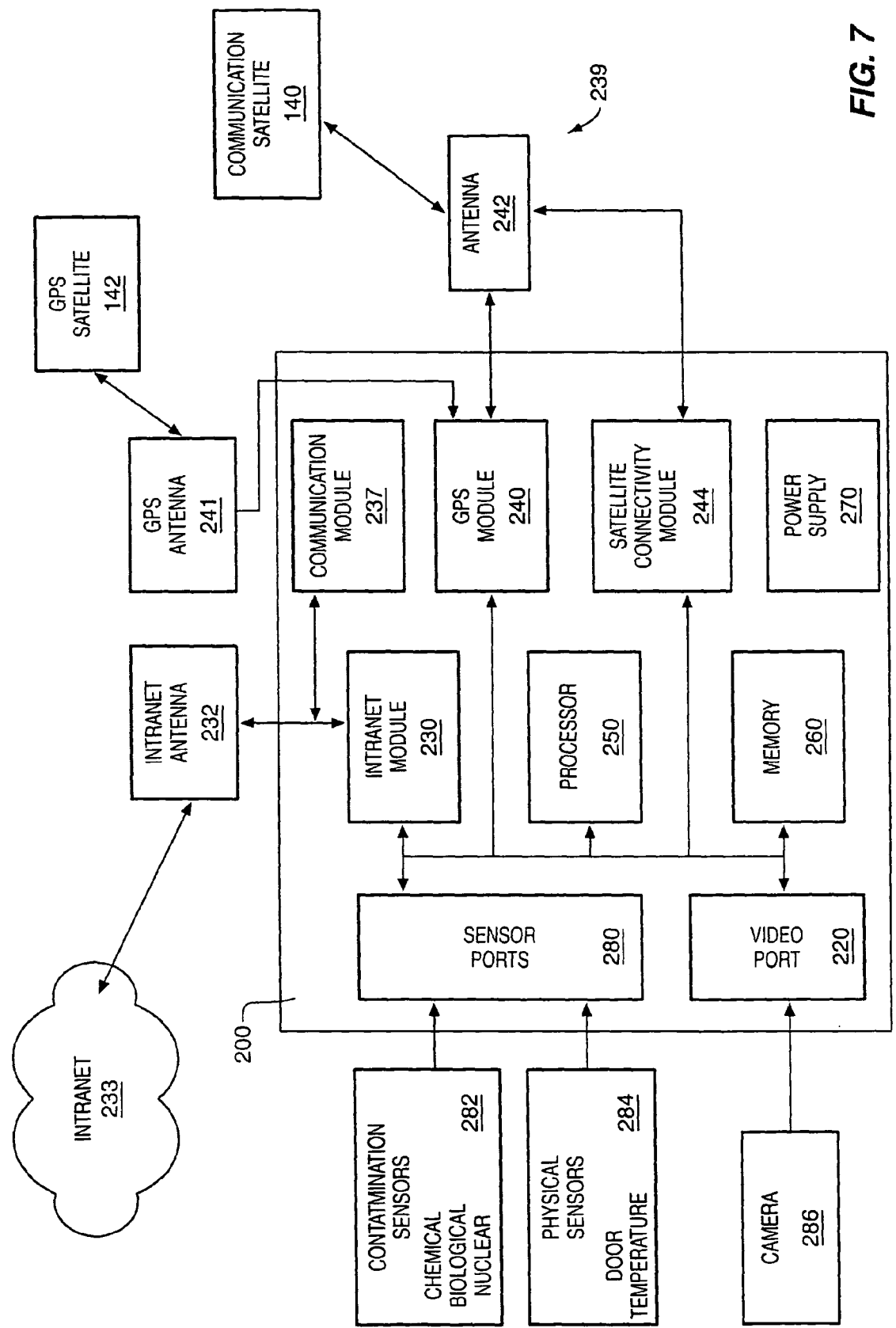
FIG. 7 is a block diagram of an agent for use with the centralized monitoring and knowledge system according to the present invention.

FIG. 7 illustrates an example of an example of an agent 200 for use with the centralized monitoring and knowledge system 100 according to the present invention. Generally, the variety of agents, the FIA for monitoring fixed assets and the CIA and the pallet trakker for tracking and monitoring mobile assets, include similar features. The agent 200 includes antennas 239, including an antenna 242 for receiving GPS position data and for sending and receiving security status data; a sensor port 280 for receiving a signal from sensing devices that sense a security condition of the container to which it is attached, and a processor 250 and memory 260 for controlling the operation of the agent 200 and storing the security status data and the GPS position data. An Intranet module 230 and corresponding Intranet antenna 232 allows two or more agent 200 to communicate and share security status data and/or GPS position data.

The mobile agent further includes a self-contained power source 270 which is capable of providing sufficient power for a long, unattended, period of time. The electronics comprising the agent may be low power devices, such as ferroelectric devices. Further, the agent may include electronics to allow the agent to remain in a sleep mode over an extended period of time. To decrease the reliance on the agent power supply, the individual sensing devices may include an independent power source such as a battery. A fixed asset agent includes battery backup power and is designed to otherwise operate off facility power.

The sensing devices may include a contamination sensor 282 for detecting the environment within the container including detecting chemicals, biological contaminants, and radiation. Physical sensors 284 connected with the container may include sensors for detecting an opening and a closing of the door, tampering with the container or a temperature-sensing device for monitoring the temperature of the ambient air within the container. An opening and closing of the container door may indicate that the container has been tampered with or that a package may have been implanted into the container. If the container has been otherwise tampered with, the contamination sensors 282 may be used to sense the environment within the container for changes. The contamination sensors may include a radiation detector, or may detect a chemical or biological material within, or in close proximity to, the container. In an embodiment, the agent 200 further includes a camera 286 for monitoring the interior of the container and the area surrounding the container.

Since a plurality of containers may be loaded into an area that is not within range of the GPS satellite or the communication satellite, the agent 200 may include an Intranet module 230 and an Intranet antenna 232 to allow a plurality of agents to share security status data and/or GPS position data via virtual network 233 between the plurality of agents. For example, the agent that received GPS position data may share that GPS position data with the other agents. The agent includes logic and software to create a virtual network between the plurality of agents and for selecting a primary and a secondary agent for compiling the security status data and the GPS position data.

The agent 200 also includes a communication module 237 for transmitting and receiving data to and from the onboard master control unit 210 (FIG. 5), port master control unit 212 (FIG. 4) or the GOMAC 300 and includes software for encrypting the data prior to transmission and may include software for compressing the ciphertext prior to transmission. Communication module 237 is preferably combined with or part of Intranet module 230, but may also be a separate module, and may have a separate antenna.

Figure 8:
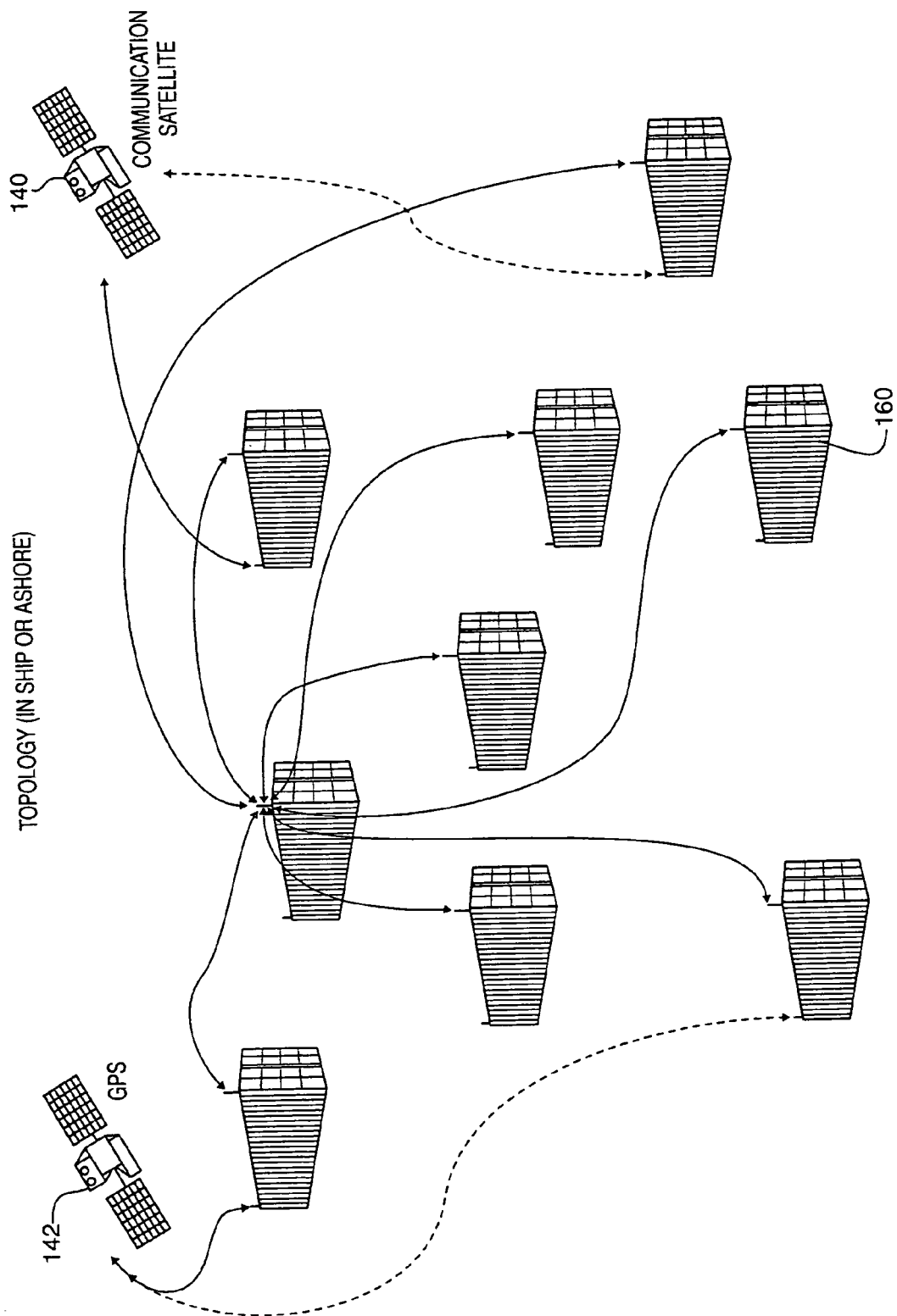
FIG. 8 is a topological view of a plurality of containers monitored using the present centralized monitoring and knowledge system.

FIG. 8 illustrates a topological block diagram of a plurality of containers 160 wherein the agents attached to each container communicate via the virtual network 233 and one or more of the agents communicates with the GOMAC via a communication satellite 140 or receives GPS position data from the GPS satellite 142. Each agent monitors the security status of the container to which it is connected and either transmits the security status to one of the master control units or to a primary agent, agent 206 in the example of FIG. 5. The same agent or another one of the agents receives the GPS position data and shares the GPS position data with the primary agent 206 which also receives security status data from the plurality of agents. The compiled security status data and GPS position data are transmitted via the virtual network to the primary agents within range of the communication satellite which retransmits the compiled security data to the master control unit 210, 212, if available, or to the GOMAC 300.

Master Control Unit and Global Operations Monitoring and Analysis Center

In an embodiment of the present invention, master control units 210, 212 are installed in participating shipper loading docks, origination ports, destination ports, and designated distribution centers for monitoring and tracking mobile assets. When monitoring fixed assets, a master control unit may be located within a building, parking structure or other area within a city. The master control units communicate with a GOMAC 300 for their designated area.

The loading dock master control unit may be located at the shipper's facility to provide a starting location, compile a manifest for each container, and upload the compiled data to the agent connected with the loaded container and to the GOMAC for the designated area. As a container is transported between the shipper's loading dock and the origination port, the agent transmits position data and security status data to at least one of the loading dock master control unit and the origination port master control unit. As the containers near the origination port, the origination port communicates with the agents until the containers are loaded onto the vessel.

An onboard master control unit 210 (FIG. 7) communicates with the CIA or pallet trakker connected with the container loaded onto the vessel 40. The onboard master control unit includes a GPS receiver 213 and a satellite telephone transceiver 215 so that the onboard master control unit can maintain communication with the GOMAC 300 throughout the voyage. During transport of the containers, the plurality of agents provide security status data to the onboard master control unit. Global position data may be received by the onboard master control unit and the compiled security status data for the plurality of containers and the global position data is transmitted to the GOMAC for the designated area. When the onboard master control unit is unable to communicate with the GOMAC, the compiled data is stored for transmission at a later time. The onboard master control unit also responds to inquires from the GOMAC during the voyage. The agent may additionally include an encryption algorithm for encrypting the security status and position data prior to transmission to the master control unit. Likewise, the master control unit may decrypt the ciphertext, analyze the security status to detect threats, and then may encrypt the security status for transmission to the GOMAC.

The master control unit receiving security data from a plurality of FIAs may be located within a secured area of the building or other fixed asset. The plurality of FIAs may be located within the building for monitoring offices, the lobby or other public area, the computer room, facility power distribution or may be located external to the building for monitoring the perimeter surrounding the building or a parking garage. Based on the configuration of the building, a portion of the FIAs may communicate wirelessly whereas others may operate off facility power with battery backup power. In another embodiment (FIG. 6), the master control unit my receive security status data from FIAs monitoring other fixed assets within range of the master control unit.

The master control unit receives the security status data from the plurality of FIAs and processes the security status data to detect a security threat. The security status is complied and transmitted to the GOMAC for analysis. As with the security system for monitoring and tracking mobile assets, the master control unit may also receive requests from the GOMAC for security status. The master control unit may also ping the FIAs at intervals to monitor the health and integrity of the FIA.

The GOMAC 300 (FIG. 4) preferably includes one or more antennas 303 for receiving and transmitting via a communication satellite 140; a transceiver 305, a computer system 306 for processing the received data; and a memory 308, preferably in a server, for storing the received physical status data and GPS position for a plurality of agents. The computer system includes software for decompressing the received ciphertext and a decryption algorithm for decrypting the ciphertext corresponding to the security status data. In a preferred embodiment, the GOMAC is located inside the secure facilities of, and in partnership with, the Argonne National Laboratory in Argonne, Ill., southwest of Chicago.

The GOMAC 300 communicates with the agents and with the other master control units and records position data and security status data. Alert responses are processed by software that performs pattern and threat analysis. For example, a non-response from an agent triggers an exception condition and creates an alert for follow up. Additionally, detected threat conditions are transmitted from the GOMAC to the appropriate shipper officials or to government agencies or authorities based on the threat detected and the type of asset being monitored.

Global Intelligent Remote Detection System Operation

Figure 9:
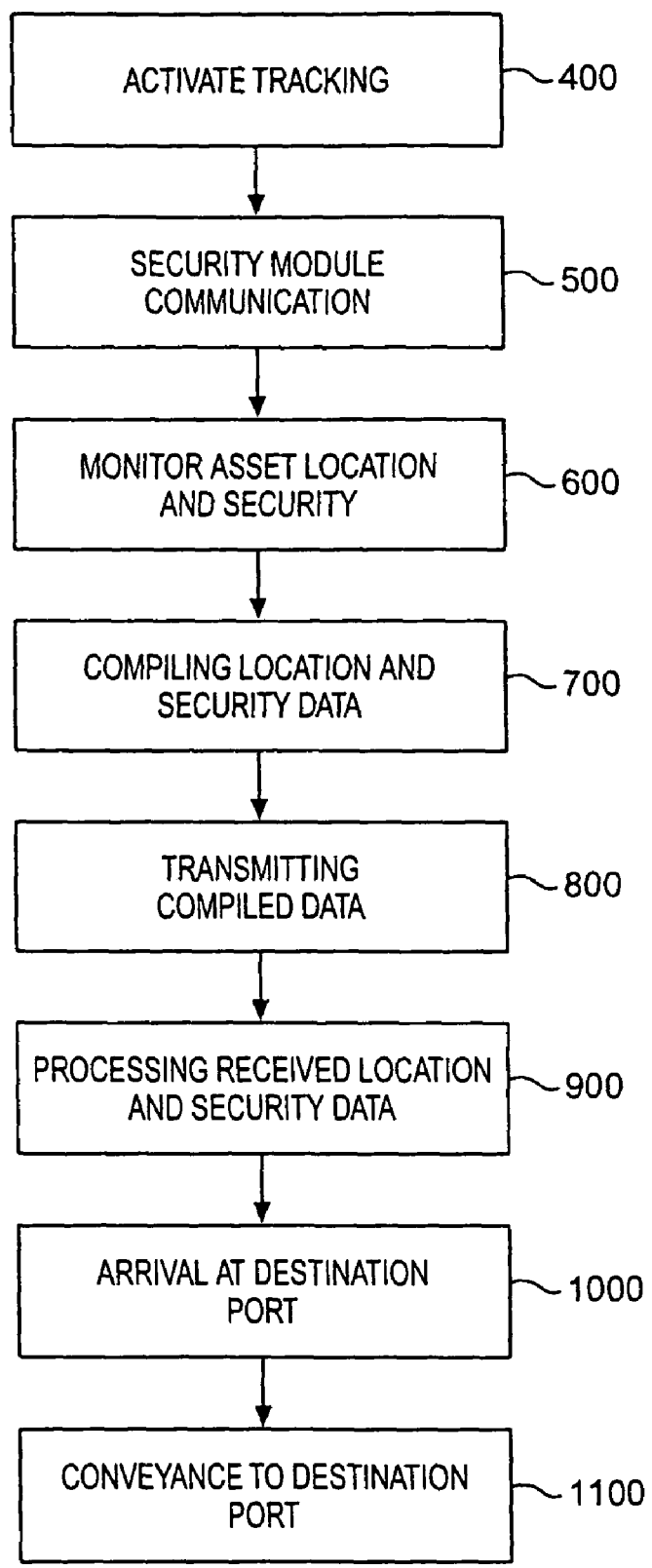
FIG. 9 is a flow diagram of the operation of the centralized monitoring and knowledge management system according to the present invention.

The present global intelligent remote detection system 100 provides a method for a GOMAC to track a security status and a GPS location of an asset. When the asset is a mobile asset, the GOMAC tracks the mobile asset during transit between a shipper's loading dock, an origination port, a destination port, and a designated distribution center. FIG. 9 is a flow diagram of the operation of the global intelligent detection system 100 of the present invention. The process is reversed for outbound export of mobile assets.

Referring to the flow diagram of FIG. 9 in conjunction with the block diagrams of FIGS. 1-6, an agent is connected with the asset being monitored. When the asset is a mobile asset, at the shipper's loading dock the cargo is loaded into the container 160 having a CIA or pallet trakker 200 and tracking of the asset is activated in process 400. An FIA is activated when the security system is installed for monitoring a security status of the fixed asset. According to FIG. 7, as additional mobile or fixed assets are activated, the agents create a virtual network 233 in process 500 to share security status data obtained from monitoring the security of the asset in process 600. The security status received from the agents is compiled at the master control unit in process 700. Periodically the compiled status data is transmitted to the GOMAC in process 800 which is processed by the GOMAC in process 900. When the asset being monitored is a mobile asset, in process 1000, the vessel carrying the mobile assets arrives at the designated destination port for unloading and conveyance of the container in process 1100 to the shipper's designated distribution center.

Figure 10:
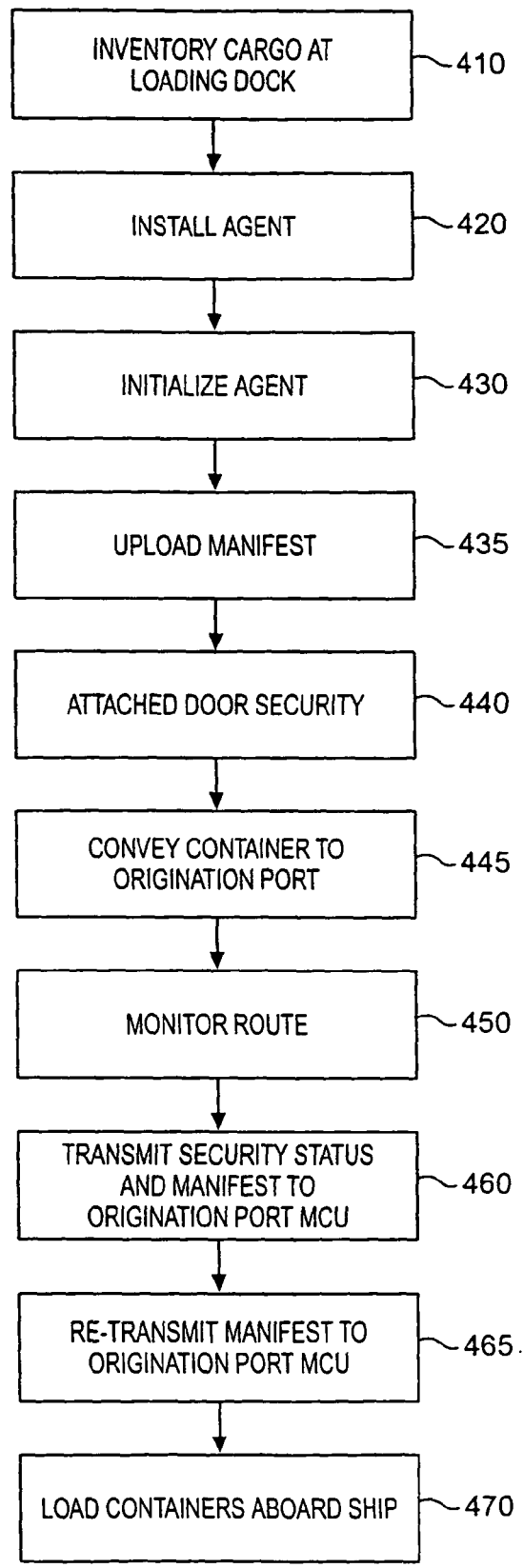
FIG. 10 is a flow diagram of a method of activating the tracking of a mobile according to the present invention.

The activate tracking process for mobile assets is shown in more detail in FIG. 10. According to the flow diagram if FIG. 10, the cargo loaded into the mobile asset at the shipper's loading dock is inventoried in process 410. The shipper's loading dock preferably includes a system 22 to automatically inventory the cargo as the cargo removed from the building and loaded into the mobile asset, such as a bar code reader, an RFID card system, or a video inventory system. In process 420 an agent 200 is installed in the mobile asset and the communication antenna 242 and the GPS antenna 241 are inserted through an air hole to the outside of the container or behind an RF window, to minimize shielding from the container. In process 430 the agent is initialized and a signal is sent to the loading master control unit 212 so that the GOMAC knows that the agent is on line. The signal sent from the loading master control unit also provides a starting location.

Once the agent is initialized, the manifest containing the inventory for the mobile asset is uploaded from the loading master control unit to the agent and to the GOMAC 300 in process 435. When the mobile asset is loaded, a separate door sensor 122, communicating with the agent, is installed on the locked door in process 440. Any attempt to open a locked door triggers an alarm that is transmitted from the agent to one of the master control units or to the GOMAC.

In the example illustrated in FIG. 2, the loaded mobile asset is placed onto a conveyance, by rail or truck 166, for delivery to the designated origination port 70 and vessel 80. The approved route from the shipper's loading dock has preferably been established as a part of a shipper profile for the mobile asset. During conveyance from the shipper's dock to the origination port, the route traveled is monitored in process 450 and any deviation from the approved route triggers an alert at the GOMAC and notification can be sent to the appropriate official or agency.

As the mobile asset approaches the origination port 70, the origination master control unit 212 receives a signal from the CIA or pallet trakker 200 in process 460 notifying the origination master control unit that the mobile asset has remained locked and that the mobile asset is radiation and tamper free. The CIA or pallet trakker also transmits the mobile asset manifest to the origination port master control unit in process 465. At the origination port, the mobile assets are loaded in process 470 onto the shipping vessel 80 for transport to the destination port 850.

Since the cargo within the mobile assets was inventoried in process 410, the manifest is easily provided for inclusion on the shippers manifest prior to shipment as required by US Custom's new rules. The information is transmitted from the origination port master control unit to a terminal manned by a local customs agent for review and approval. The customs agent may authorize the mobile asset for expedited handling and delivery to the vessel for loading. Mobile assets that are not utilizing the present system and method for providing centralized monitoring and knowledge management services will most likely go through a manual inspection process, creating delays in loading, or may result in refusal to load the mobile asset.

Figure 11:
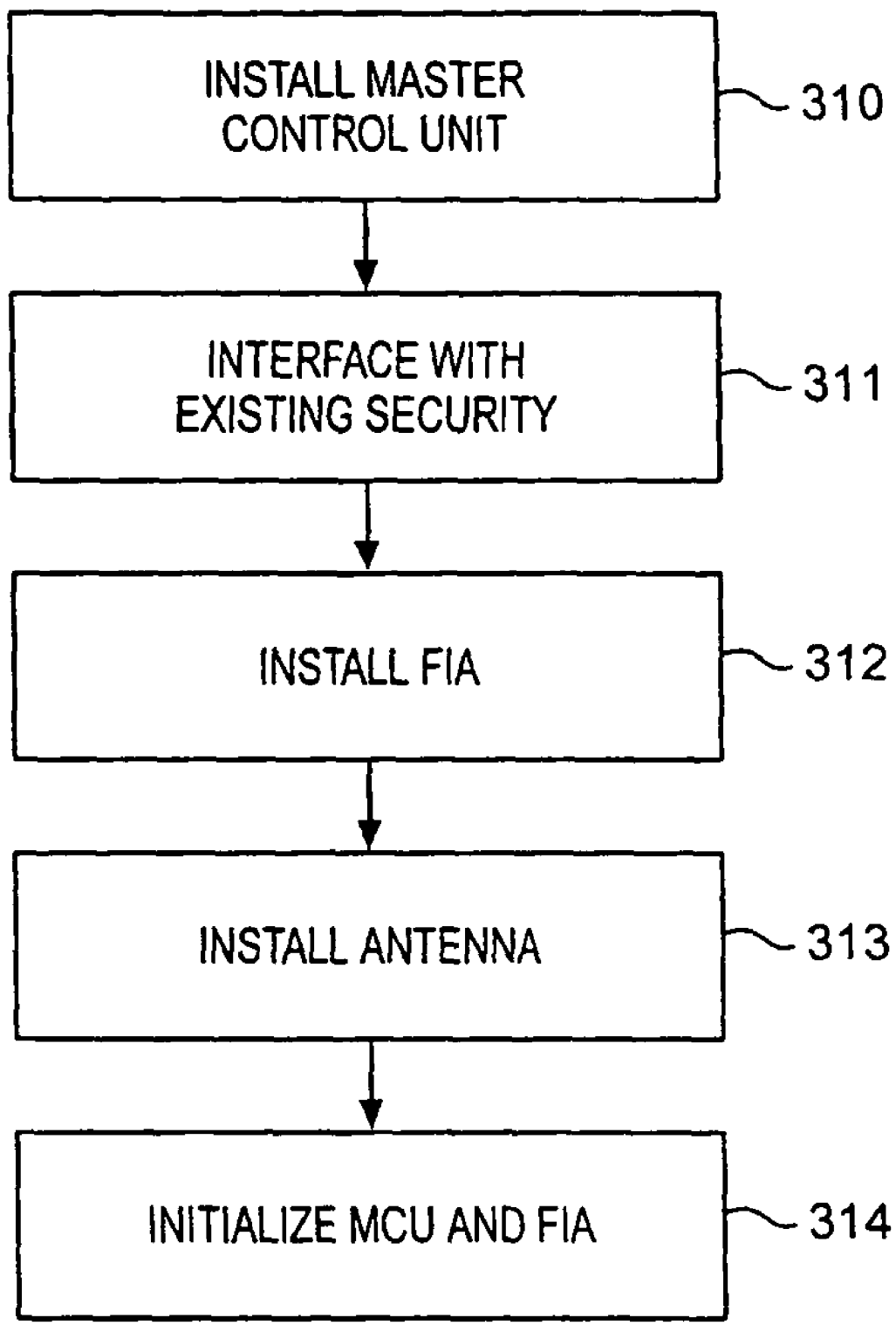
FIG. 11 is a flow diagram of a method of activating the security system of a fixed according to the present invention.
Figure 12:
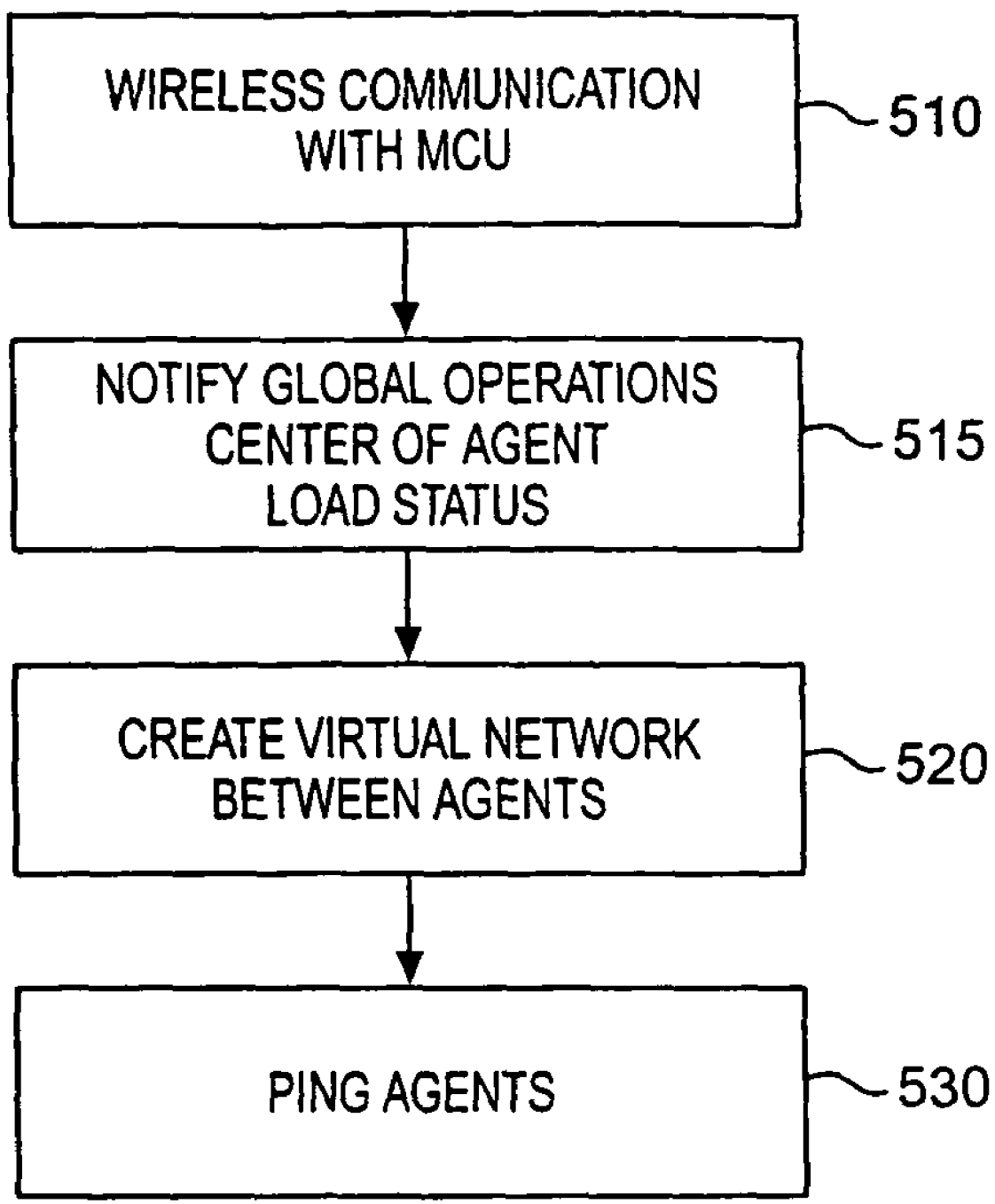
FIG. 12 is a flow diagram of communication with a plurality of agents according to the present invention.

The activate tracking process for fixed assets is similar to the process for mobile assets wherein the agent is installed and signals the master control unit that the agent is on line. The activate tracking process for fixed assets is shown in more detail in FIG. 11 in conjunction with FIG. 6. While the fixed asset 10 may be a building, enterprise, campus, city surveillance, transportation facility, power station or substation, or other area, the process is described for a building for illustrative purposes. According to the flow diagram if FIG. 11, a master control unit 30 is installed in the building in process 310. The master control unit includes an interface for interfacing with existing security systems 12. In process 311 the existing security systems 12 are interfaced with the master control unit 30 such that the existing security systems 12 are under the control of the master control unit 30 and security data or signals from the existing security systems 12 are received at the master control unit 30.

In process 312 a plurality of FIAs are installed in various locations within the building in process 310. The locations may be individual offices, a lobby or other public access location, a computer or power distribution location, to name a few. The communication connection between the master control unit 30 and the plurality of FIAs 12-14 may be a dedicated security channel, a wireless communication channel, or a combination thereof. In process 313 a communication antenna connected to the master control unit is installed on the building for communication between the master control unit and a gomac for the geographical area.

In process 314 the master control unit and the FIAs are initialized. Once the master control unit and the plurality of FIAs are initialized, a signal is sent from the FIAs to the master control unit so that the master control unit will know that the FIAs are on line. Likewise, the master control unit signals the GOMAC that the master control unit is on line and notifies the GOMAC of the FIAs which are also on line.

According to FIG. 9, as the mobile assets are loaded into the hold of the ship or FIAs are installed in various locations, the agents within range of one anther begin communicating in process 500. This process is illustrated in detail in FIG. 13. The agent 200 communicates with the master control unit 210 in process 510 and in process 515 the master control unit notifies the GOMAC 300 that the mobile asset has been loaded or that the fixed asset is on line. The plurality of agents communicate with each other by creating a virtual network 233 in process 520 between the plurality of agents. If one of the agents fails or is defeated, another agent in close proximity may detect a radiation or other threat. The loss of communication from the agent also triggers an alarm at the GOMAC. The master control unit includes a satellite telephone transceiver 215 so that communication can be maintained. When the assets are mobile, the master control unit also includes a GPS receiver for receiving position data. The master control unit may periodically interrogate or ping each agent in process 530 to insure that the agents are awake and working properly.

Figure 13:
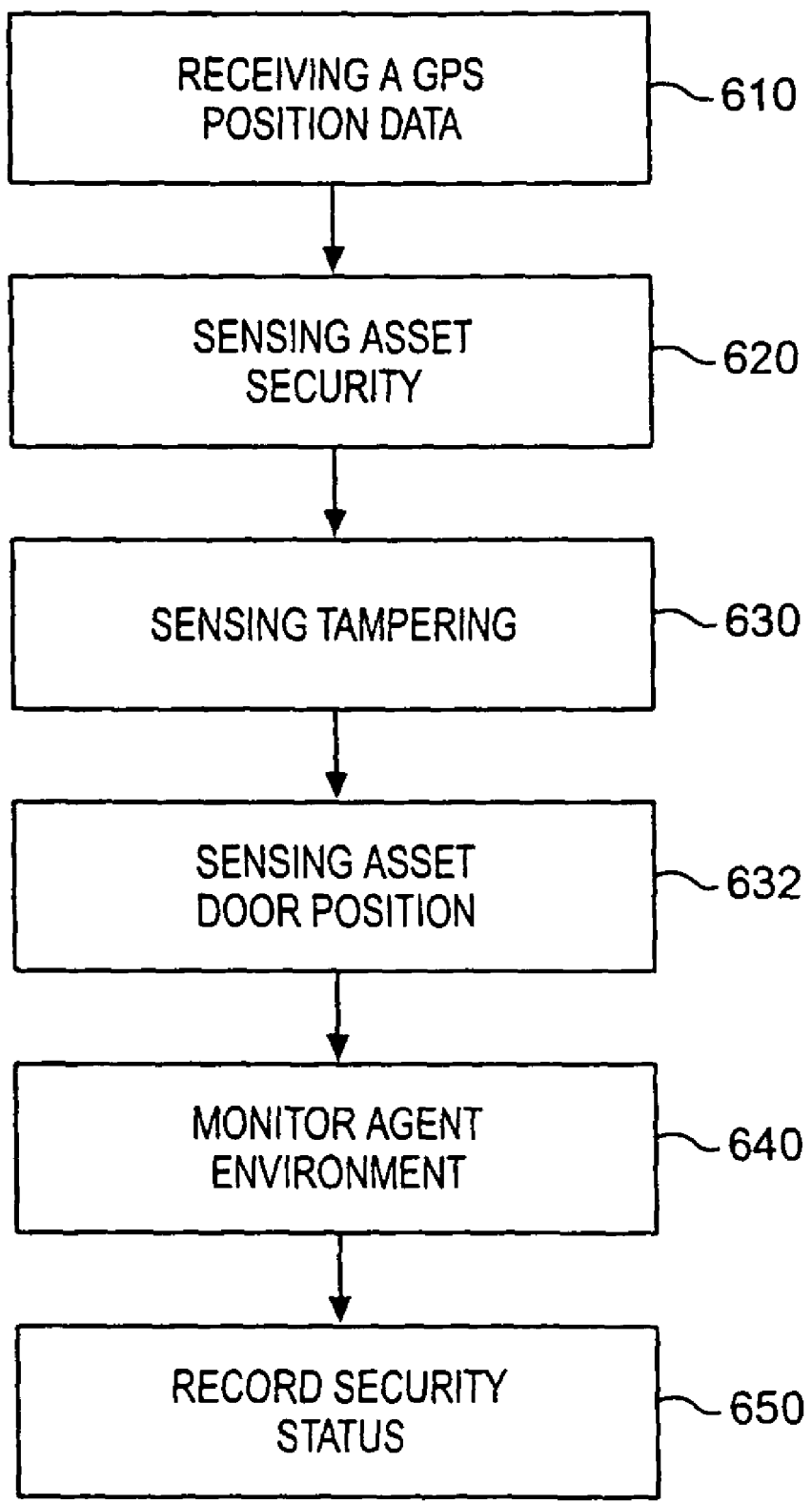
FIG. 13 is a flow diagram of a method of monitoring a security status of an asset according to the present invention.

The monitoring of mobile asset location and mobile and fixed asset security process 600 is shown in detail in FIG. 13. According to FIG. 13, in process 610 an agent 200 with a GPS receiver and within range receives GPS position data and in process 620 each agent senses the security status of the asset 160 and the environment within the asset. Sensing devices 282, 284 connected with the agent detect whether the fixed asset has been tampered with in process 630, including detecting an opening of the asset door 162 in process 632. Sensing devices connected with an FIA may detect employee or visitor access, activity within a parking garage, or an interruption of power for example. Environmental sensors connected with the agent may include chemical or biological detectors. These may also be used to detect radiation. The agent may also detect radiation emanating from a nearby source outside the perimeter of the asset, thereby further increasing the integrity of the entire asset. In process 650, the agent records the security status data for transmission to the master control unit 210, an onboard master control unit in this example.

Figure 14:
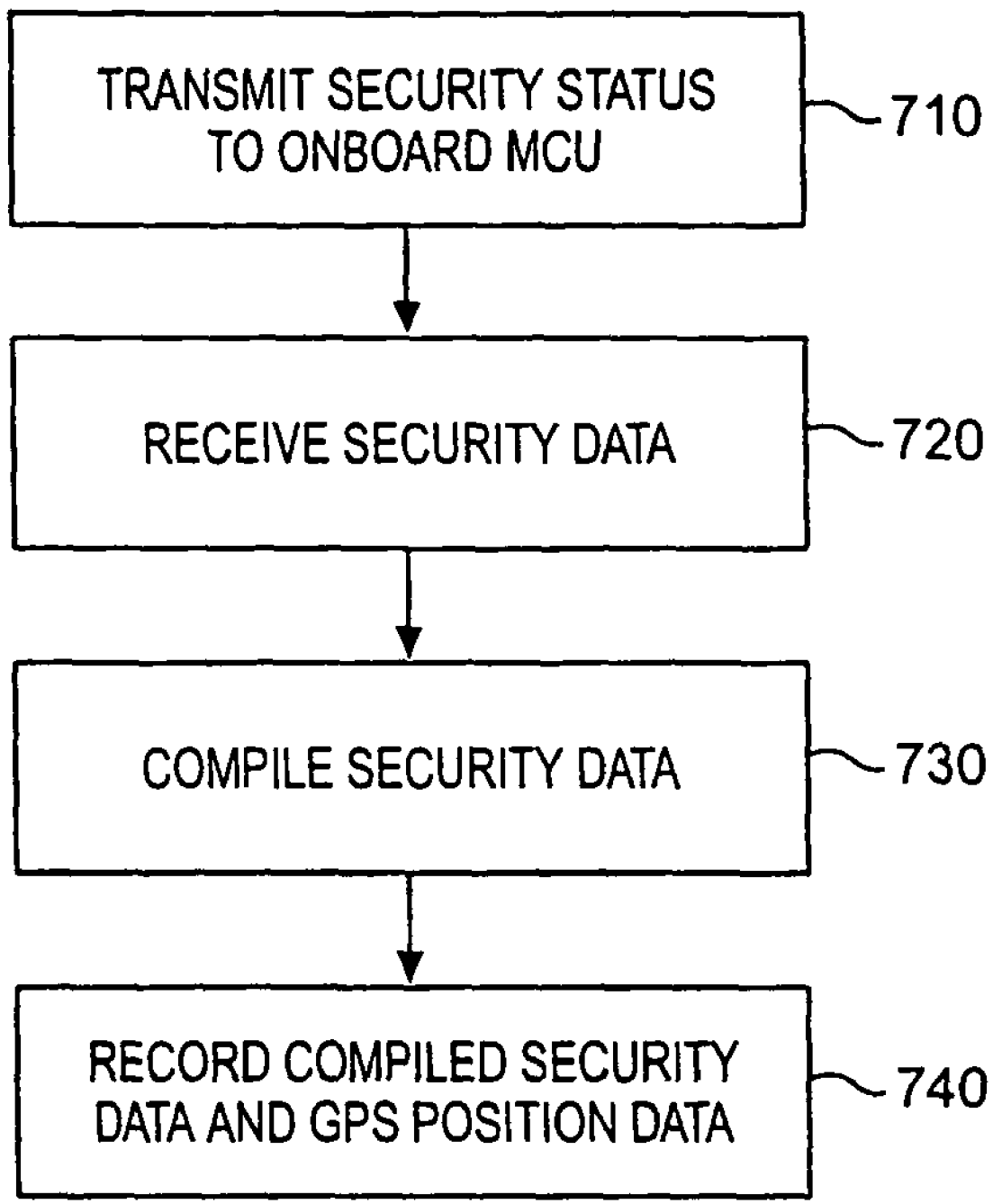
FIG. 14 is a flow diagram of a method of compiling security status data from a plurality of containers according to an embodiment of the present invention.

In process 700 of FIG. 9, the asset security status data is compiled at each agent for transmission to the master control unit where the data is retransmitted to the GOMAC in process 800. This process is shown in detail in FIG. 14. According to FIG. 14, in process 710 each agent transmits their corresponding security status data to the master control unit 210. The master control unit receives the security status data in process 720 and in process 730 compiles the security status data from the agents and the GPS position data received from the GPS satellite, when required. The compiled GPS position data and individual security status data are recorded at the master control unit in process 740.

Figure 15:
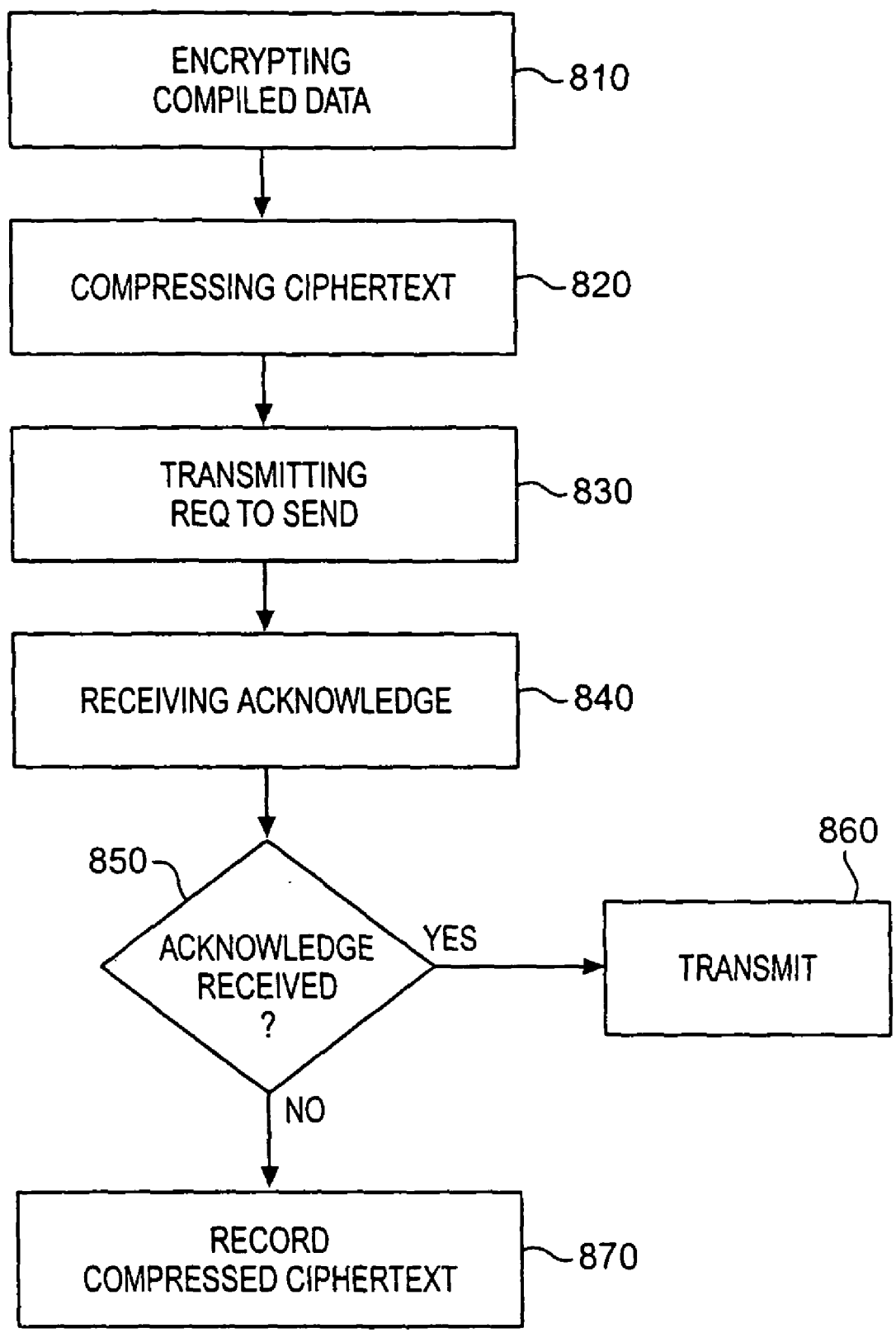
FIG. 15 is a flow diagram of a method of transmitting status data to a global operations center according to an embodiment of the preset invention.

According to FIG. 9, in process 800 the compiled location and security data is transmitted from the master control unit to the GOMAC for the designated area. This process is shown in detail in FIG. 15. Prior to transmitting the data in process 800, according to FIG. 15, in process 810 the compiled data may be encrypted to produce a ciphertext, and in process 820 the ciphertext may be compressed for transmission. Encryption of the compiled data provides a level of security while compression decreases the amount of data transmitted from the master control unit. A request to transmit may be sent to the GOMAC 300 in process 830 and upon receipt of an acknowledgment or clear to send signal from the GOMAC in process 840, the master control unit transmits the compressed data in process 860 to the GOMAC. If an acknowledgment is not received in process 850, the master control unit records the data in process 870 for transmission at a later time. Alternatively, the master control unit may also retransmit the compressed data to the GOMAC.

Figure 16:
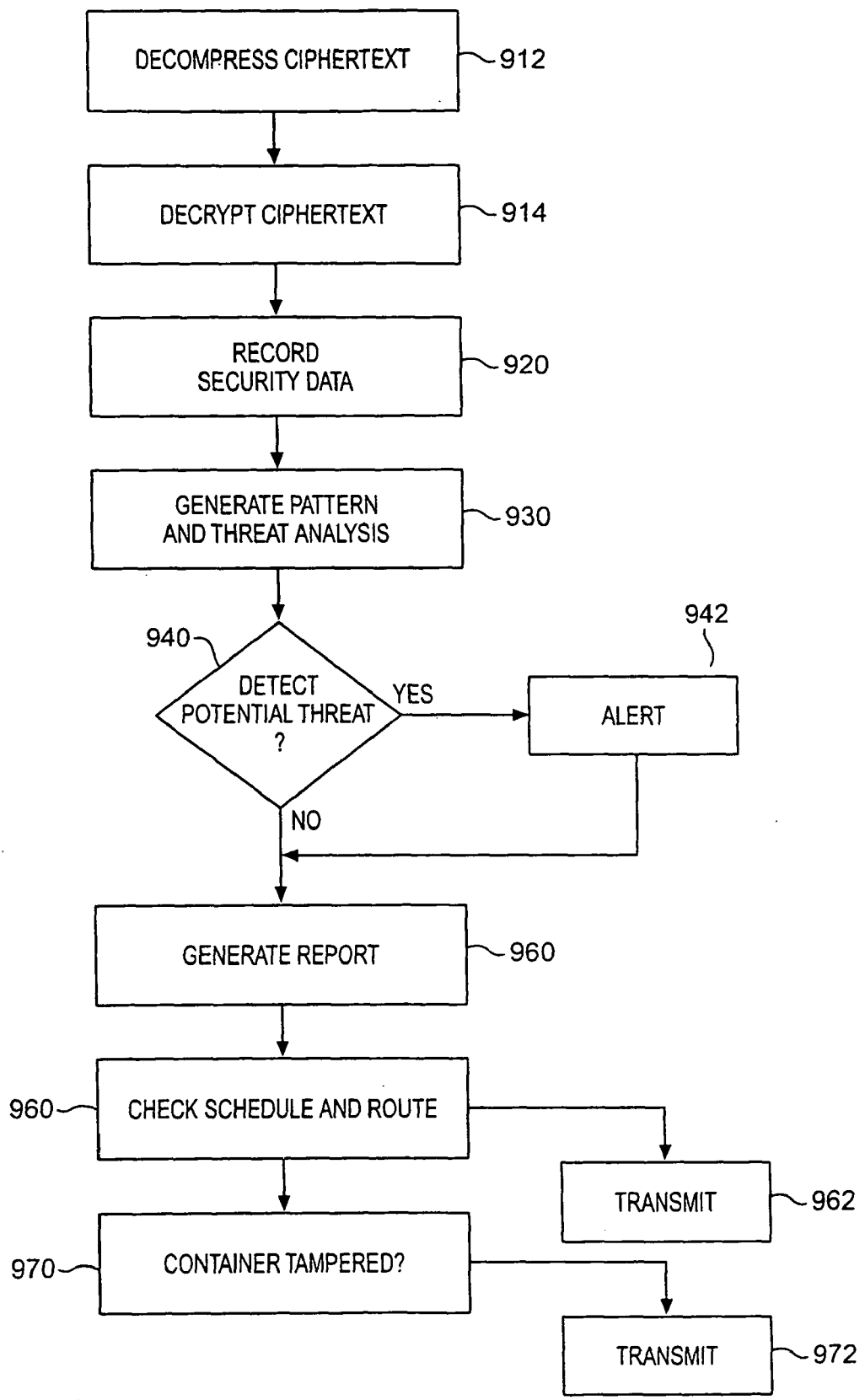
FIG. 16 is a flow diagram of a method of processing data at the global operations center according to an embodiment of the preset invention.

According to FIG. 9, in process 900 the global operations center receives and processes the location and security data. This process is shown in detail in FIG. 16. After decompressing and decrypting the compiled data in processes 912 and 914, respectively, the compiled data is recorded in process 920 according to FIG. 16. The GOMAC computer system 306 includes software for analyzing the compiled security status data to generate a pattern analysis and a threat analysis in process 930. If a potential threat condition is detected in process 940, an alert is transmitted in process 942 to the appropriate official or agency. Whether or not a threat is not detected in process 940, a status report may be generated in process 950.

Status reports may be generated in real time at periodic intervals or upon request. A non-response from an agent may trigger an exception condition that creates an alert for follow up or an alarm to determine if the security device is back on line. A non-response from the master control unit or detection of an unauthorized deviation in the pre-approved route or schedule in process 960 may trigger an alert or alarm which is transmitted in process 962 to the appropriate person, officer, official or agency. Likewise, if the threat analysis detects in process 970 that the asset has been tampered with or the integrity of the asset has been otherwise breached, the security threat is transmitted in process 972 to an appropriate person, officer, official, or agency. The transmission may be an alert requiring follow-up or may be an alarm that cannot be ignored.

Figure 17:
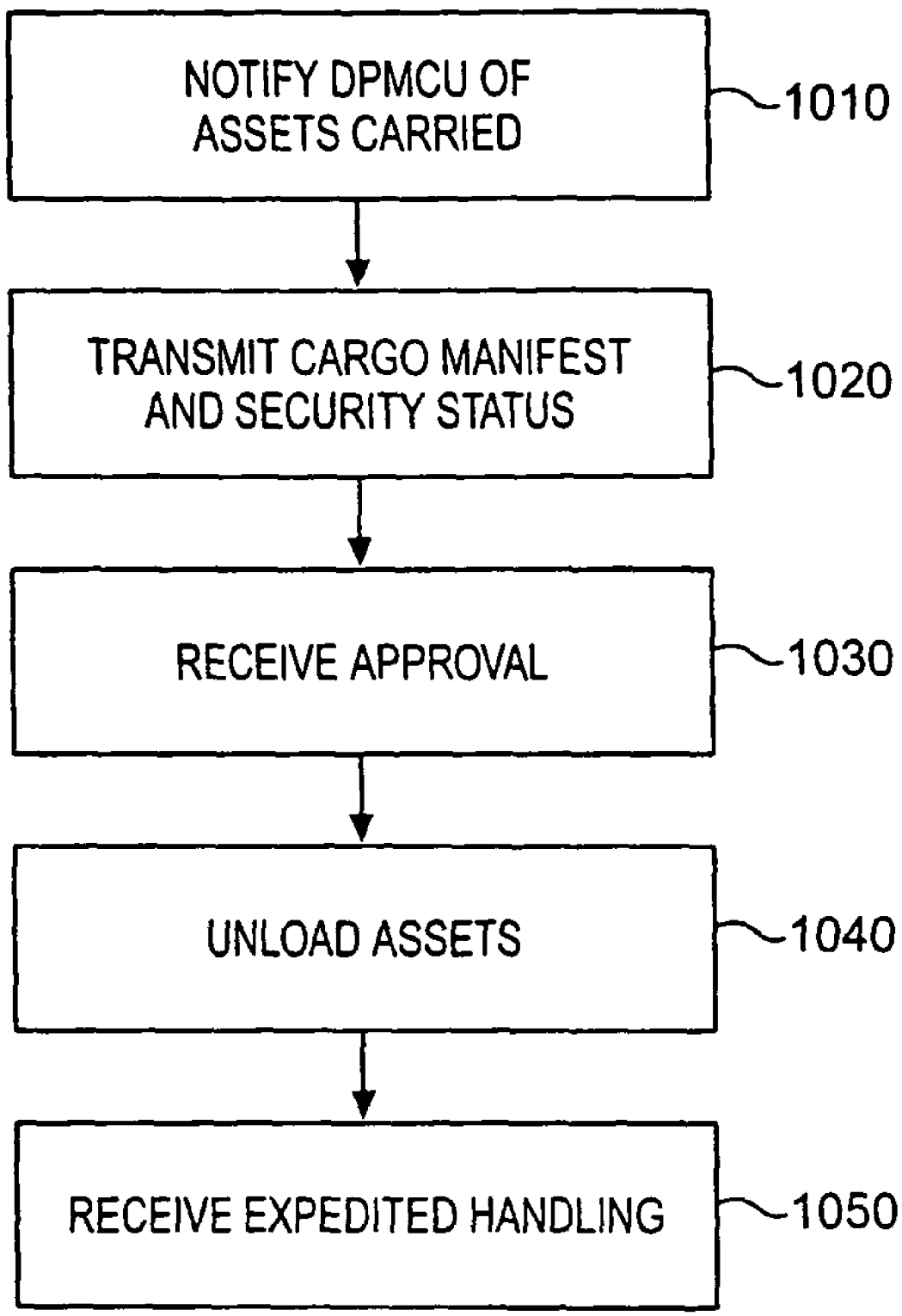
FIG. 17 is a flow diagram of the communication between the onboard master control unit and the port authorities at the destination port according to an embodiment of the present invention.

When the asset is a mobile asset being transported from an origination to a destination, the process continues for tracking the assets through the destination port and on to the designated distribution center. The processes activated upon arrival at the destination port 50 are illustrated in FIG. 17. As the vessel approaches the destination port in process 1000 of FIG. 9, the onboard master control unit 210 notifies the destination port master control unit 212 in process 1010 of FIG. 17, which containers it is carrying. In process 1020, the onboard master control unit transmits the relevant information to the destination port master control unit, including the cargo manifest for each mobile asset and a report that the mobile assets are contaminant free and have not been tampered with during the voyage. In response, the destination port master control unit may receive approval from Port Customs Officer in process 1030. The mobile assets are unloaded in process 1040 and in process 1050 may receive expedited handing by the Port Customs Officer.

Figure 18:
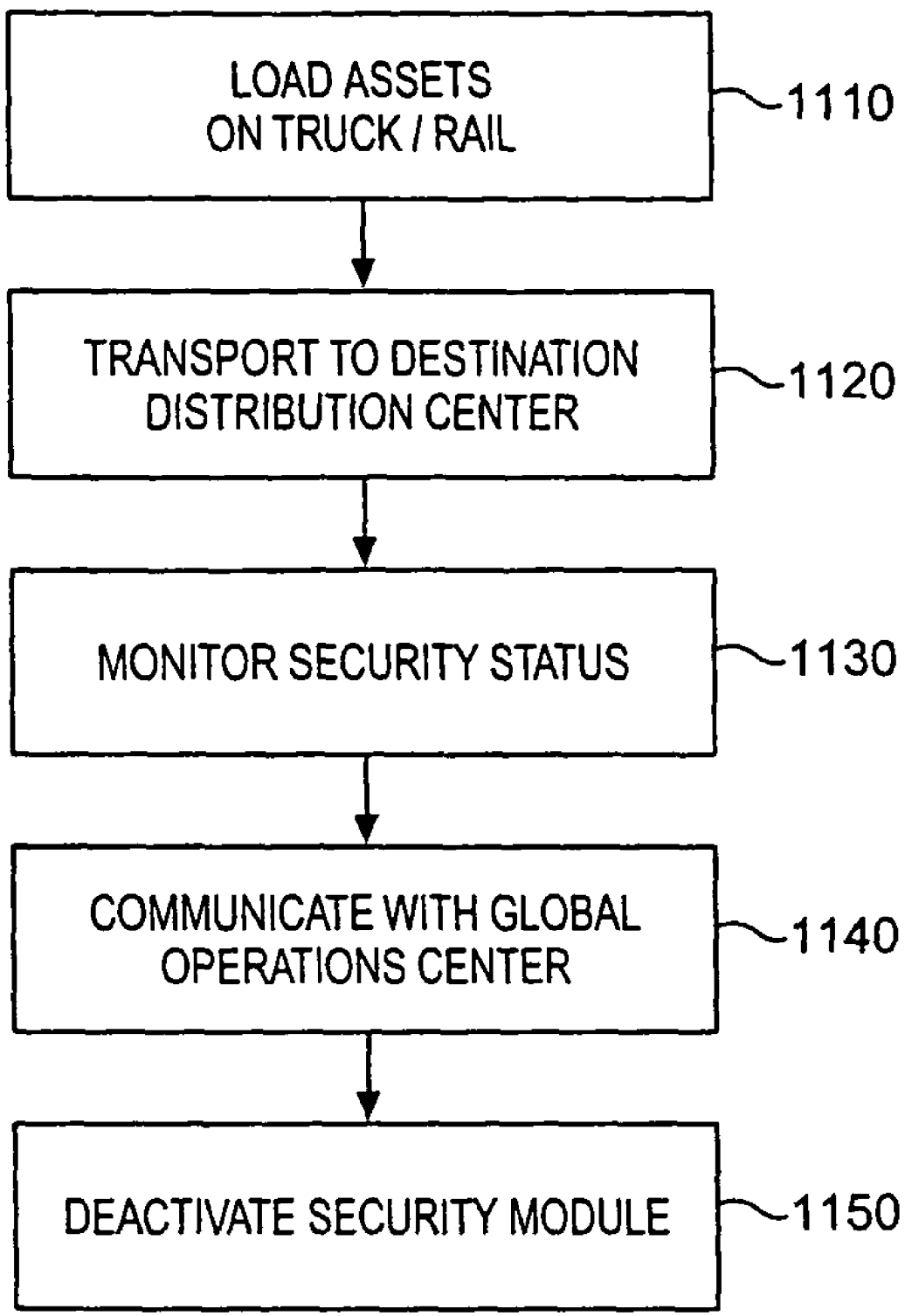
FIG. 18 is a flow diagram of a method of tracing the plurality of containers during transit from the destination port to the designated distribution center according to an embodiment of the invention.

The processes active during conveyance to the distribution center 60 are illustrated in FIG. 18. According to FIG. 18, the mobile assets are loaded in process 1110 onto a conveyance, such as rail or truck 166, and are then transported in process 1120 to the shipper's destination distribution center. During transport the agent monitors and records the security status and location in process 1130 which is transmitted to the GOMAC 300 in process 1140 through a local wireless network or through a master control unit that is installed in the truck, if available. Monitoring in process 1130 continues until the mobile asset is delivered to the designated distribution center 60. Upon arrival at the designated distribution center, the door is opened and the agent 200 is deactivated in process 1150.

The agent and installed sensors may be removed and recycled for use on an outbound mobile asset or the agent may be sent to the shipper's loading dock for reuse. Alternatively, the agent may remain installed and the mobile asset and corresponding agent reused for an outbound shipment. Regardless of the recycling method, the agents remain within a secure distribution channel to avoid theft or tampering therewith.

In an alternative embodiment, the vessel on which the mobile assets are loaded may not include an onboard master control unit. Since one of more of the loaded mobile assets may be out of range for communicating with the GOMAC, the virtual network between the agents allows the plurality of agents to communicate and to assign a primary agent for compiling the security status data from the other agents. This process is illustrated in FIG. 19.

Figure 19:
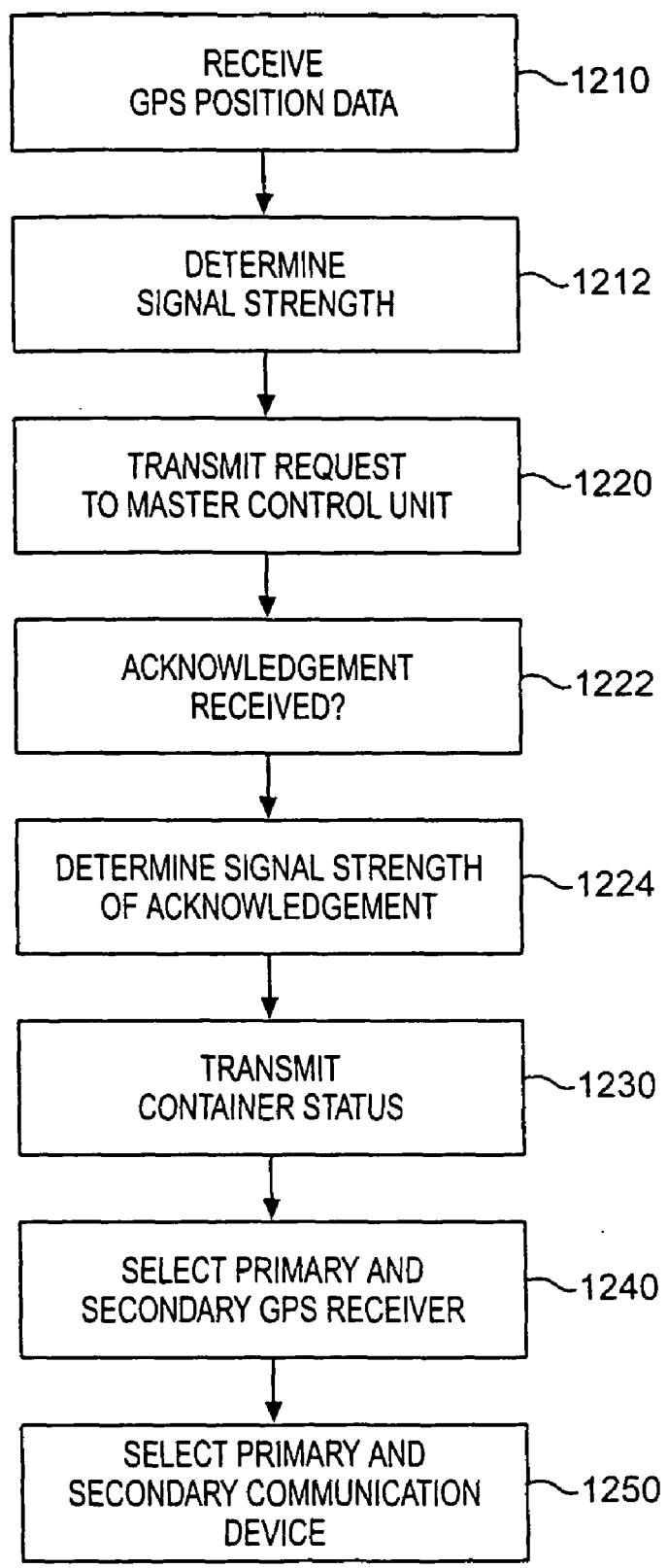
FIG. 19 is a flow diagram of a method of communicating between a plurality of agents and the global operations centers according to an alternative embodiment of the invention.

According to FIG. 19, in process 1210 each agent 200 within range receives a GPS position data from the GPS satellite and in process 1212 determines the strength of the signal. In process 1220, each agent sends a request to the GOMAC 300 and awaits receipt of an acknowledgment from the GOMAC in process 1222. If an acknowledgment is received from the GOMAC, the strength of the signal is determined in process 1224. According to FIG. 19, in process 1230 the signal strength of the GPS position data and the acknowledgment signal is wirelessly transmitted to the plurality of agents via the virtual network 233 and in process 1240 the GPS position data signal strength is used to select a primary and secondary agent for receiving and recording the GPS position of the plurality of mobile assets. In process 1250, the acknowledgment signal strength is used to select a primary and secondary agent for transmitting data to, and receiving inquires from, the GOMAC 300. Otherwise the process remains the same as described above.

While the present system and method for providing centralized monitoring and knowledge management services has been described for use tracking mobile assets, or cargo containers, during transit on a vessel, such as a ship, the system may also be used for tracking mobile assets transported on other modes of transportation such as air or rail.

There has been described a novel system and method for providing centralized monitoring and knowledge management services for tracing cargo containers 160. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described, without departing from the inventive concepts. It is also evident that the methods recited may, in many instances, be performed in a different order; or equivalent structures and processes may be substituted for the various structures and processes described. Consequently, the invention is to be construed as embracing each and every novel feature and novel combination of features present in and/or possessed by the invention herein described.

The invention claimed is:

1. A security system for tracking a security status of an asset comprising:
   an agent connected with the asset, the agent comprising:
      a sensing device for monitoring a security of the asset;
      a processor for compiling a security data to generate a security status; and
      a transceiver for transmitting data from and receiving data to the agent;
   a master control unit for receiving and compiling said security status from a plurality of agents and for transmitting said compiled security status; and
   a global operations center for receiving said compiled security status and analyzing the compiled security status to detect a security threat.

2. The security system of claim 1 wherein said sensing device comprises:
   an environmental sensor for monitoring an ambient air within the container to detect the security threat.

3. The security system of claim 2 wherein said environmental sensor comprises:
   a chemical detector for detecting a chemical matter.

4. The security system of claim 2 wherein said environmental sensor comprises:

a biological detector for detecting a biological matter.

5. The security system of claim 2 wherein said environmental sensor comprises:
a radiation detector for detecting a radioactive material.

6. The security system of claim 1 wherein said sensing device comprises:
a door position-sensing device for sensing an opening of an asset door.

7. The security system of claim 1 wherein said sensing device comprises:
a light-sensing device within said container for sensing a luminescence level.

8. The security system of claim 1 wherein said agent further comprises:
a video recording device for recording at least one of an interior of the asset or an exterior area surrounding the asset.

9. The security system of claim 1 wherein said agent further comprises:
an intranet module for communicating between a plurality of said agents via a virtual network.

10. The security system of claim 1 wherein said asset is a mobile asset, the system further comprising a receiver for receiving a position data.

11. The security system of claim 10 further comprising:
a loading master control unit for inventorying a cargo loaded into the mobile asset and creating a manifest therefrom, wherein said manifest is uploaded from the loading master control unit to said agent and said global operations center.

12. The security system of claim 11 further comprising:
an origination port master control unit at an origination port for receiving said manifest and the security status from one of: said agent, and said global operations center.

13. The security system of claim 11 further comprising:
a destination master control unit at a destination port for receiving said manifest and said security status from one of: said agent, and said global operations center.

14. The security system of claim 10 wherein said loading master control unit comprises:
an electronic device for automatically inventorying the cargo as the cargo is loaded into the mobile asset at a shipper's loading dock.

15. The security system of claim 10 wherein the agent further comprises a memory for storing a manifest of the cargo loaded into the mobile asset.

16. The security of claim 1 wherein said asset is a mobile asset, the system further comprising an inertial guidance system for providing a position data.

17. The security system of claim 1 where said asset is a mobile asset, the system further comprising commercial guidance system for providing a position data.

18. The security system of claim 1 wherein the master control unit is onboard a transit vehicle carrying said fixed asset, the onboard master control unit comprises:
a receiver for receiving location data, and
a transmitter for transmitting the location data and said security status to said global operations center.

19. The security system of claim 18 wherein said security system further comprises:
a memory for storing information regarding a predetermined route for said mobile asset; and wherein one of said agent, said onboard master control unit, and said global operations center includes a comparator system for comparing said location data to said predetermined route.

20. The security system of claim 18 wherein said global operations center includes an output device for outputting an alert signal if said location data deviates from said predetermined route.

21. The security system of claim 1 wherein the asset is a fixed asset, the system further comprising:
an output device for responding to a detected security threat, and wherein one of said agent, said master control unit and said global operations center includes a response process for responding to the detected security threat.

22. The security system of claim 21 wherein said output device controls an operation of a door.

23. The security system of claim 21 wherein said output device controls an operation of a lighting system.

24. The security system of claim 21 wherein said output device controls an operation of a ventilation system.

25. The security system of claim 21 wherein said output device controls an operation of a power distribution system.

26. The security system of claim 21 wherein said output device controls an operation of a computer network.

27. The security system of claim 21 further comprising:
an interface for interfacing an existing security device to the master control unit.

28. A security system for monitoring a plurality of assets comprising:
a plurality of agents, each one of said plurality of agents connected with an asset, each one of said plurality of agents comprising:
a sensor for monitoring a physical condition of the corresponding one of said plurality of assets;
a processor for collecting and processing the physical condition data to produce an asset security data; and
a communication device for transmitting and receiving data;
a master control unit for receiving the plurality of asset security data from the plurality of agents; and
a global operations center in communication with the master control unit for receiving the plurality of asset security data retransmitted from the master control unit and analyzing the plurality of asset security data to detect a security threat.

29. The security system of claim 28 wherein said sensor comprises a sensor selected from the group consisting of: door sensor for sensing an opening of a door connected with said asset and signaling the agent when the door has been opened; a light-sensing devise within said asset for sensing a luminescence level within said asset; an air sensor for sensing an ambient air within said asset to detect a chemical within range of the asset; and a biological detector for detecting a biological material within range of said asset.

30. The security system of claim 28 said sensor comprises a radiation detector for detecting a radioactive material within a close proximity to said asset.

31. The security system of claim 28 wherein the plurality of assets are mobile assets in transit from a shippers loading dock to a designated destination following a predetermined route, the predetermined route including an origination port and a destination port, the agent further comprising a receiver for receiving a position data from a satellite.

32. The security system of claim 31 wherein said master control unit is an onboard master control unit, the onboard master control unit further comprising:
a receiver for receiving a location data from a satellite, wherein the onboard master control unit receives the plurality of asset security data and compiles the plurality of asset security data and the location data for transmission to the global operations center.

33. The security system of claim 31 wherein the system further comprises:
a memory for storing information regarding a predetermined route for said mobile asset; and
wherein one of said agent, said onboard master control unit, and said global operations center includes a comparator system for comparing said location data to said predetermined route.

34. The security system of claim 31 further comprising:
a loading master control unit at said shipper's loading dock; and an electronic inventory device in communication with the loading master control unit for automatically inventorying a cargo loaded into the mobile asset, wherein an inventory data is sent to the loading master control unit to generate a manifest that is uploaded to the one of the plurality of agents connected with the one of the plurality of mobile assets being loaded and the global operations center.

35. The security system of claim 31 further comprising:
an origination port master control unit at the origination port and in communication with said plurality of agents, wherein said plurality of agents transmit their manifest and asset security data to the origination port master control unit.

36. The security system of claim 31 further comprising:
a destination master control unit at the destination port, wherein the onboard master control unit notifies the destination master control unit which plurality of containers it is carrying and uploads the manifest and the security status from the plurality of agents to the destination port master control unit.

37. The security system of claim 28 wherein the asset is a fixed asset, the system further comprising:
an output device for responding to a detected security threat, and wherein one of said agent, said master control unit and said global operations center includes a response process for responding to the detected security threat.

38. The security system of claim 37 wherein said output device controls an operation of a door.

39. The security system of claim 37 wherein said output device controls an operation of a lighting system.

40. The security system of claim 37 wherein said output device controls an operation of a ventilation system.

41. The security system of claim 37 wherein said output device control an operation of a power distribution system.

42. The security system of claim 37 wherein said output device controls an operation of a computer network.

43. The security system of claim 37 wherein said output device is a radiation detector for producing nuclear radiation data indicative of nuclear radiation in said fixed asset.

44. The security system of claim 37 further comprising:
an interface for interfacing an existing security device to the master control unit.

45. A security system for monitoring a security status of a plurality of assets, said security system comprising:
a plurality of agents, each of said agents connected to one of said assets; each agent comprising:
a sensing device for monitoring a security of the asset for providing a security data;
a wireless transmitter system for transmitting said security data from said agent;
a wireless receiver for receiving said security data from other of said agents;
an electronic memory for storing said security data from said agent and from other of said agents; and
a processor for compiling the security data from said agent and from other of said agents;
wherein said agents together provide an Intranet redundantly storing said security data from the plurality of agents.

46. The security system of claim 45 wherein said plurality of assets are a plurality of mobile assets being transported, said security system further includes a master control unit located on a vessel on which said mobile assets are being transported, said master control unit including a receiver for receiving said security data.

47. The security system of claim 46 wherein the processor determines which of said agents transmits said security data to said master control unit.

48. A method for monitoring a security of an asset, the method comprising:
activating an agent connected with said asset;
at said agent, monitoring a security status of the asset;
at said agent, compiling the security status of the asset to generate a security status data;
transmitting the security status data from the agent to a master control unit;
at said master control unit, compiling the security status data from a plurality of agents;
retransmitting the compiled security status data from the master control unit to a global operations center; and
processing the compiled security status data at the global operations center to detect a security threat.

49. The method of claim 48 wherein monitoring a security status comprises monitoring at least one of an area surrounding the asset and an interior of the asset.

50. The method of claim 48 wherein monitoring a security status comprises:
monitoring an environment within the asset to detect a threat therein; and
monitoring a physical condition of the asset to detect a tampering therewith.

51. The method of claim 50 wherein monitoring an environment comprises:
sensing an ambient air within the asset to detect a chemical therein; and
signaling the agent when a chemical has been detected.

52. The method of claim 50 wherein monitoring an environment comprises:
sensing an ambient air within the asset to detect a biological matter therein; and
signaling the agent when a biological matter has been detected.

53. The method of claim 50 wherein monitoring an environment comprises:
sensing an ambient air within the asset to detect an explosive therein; and
signaling the agent when an explosive has been detected.

54. The method of claim 50 wherein monitoring an environment comprises:
sensing an ambient air within the asset to detect a radioactive material therein; and
producing a nuclear radiation data indicative of a radiation within the asset when the nuclear radiation has been detected; and
transmitting the nuclear radiation data to the agent.

55. The method of claim 50 wherein monitoring an environment comprises:
sensing an ambient air around the periphery of the asset to detect a radioactive material;

producing a nuclear radiation data indicative of a radiation within the asset when a radiation has been detected; and transmitting the nuclear radiation data to the agent.

56. The method of claim 50 wherein said monitoring an environment within said asset comprises recording a video of at least one of an interior of said asset and an area surrounding said asset.

57. The method of claim 50 wherein said monitoring an environment within said container comprises monitoring a temperature within said container.

58. The method of claim 50 wherein monitoring a physical condition comprises:

sensing an opening of a door connected with the asset; and
signaling the agent when the door has been opened.

59. The method of claim 48 wherein said compiling comprises:

compiling said security status to produce a status data; and
encrypting said status data to generate a ciphertext; and
wherein said transmitting comprises transmitting said ciphertext to said master control unit.

60. The method of claim 48 wherein said processing said security status comprises:

receiving said security status at the global operations center at intervals;
generating a threat analysis from the security status to detect said security threat; and
transmitting the security threat to at least one of an appropriate official and an appropriate agency.

61. The method of claim 48 wherein processing the security status and location data comprises generating a report from the received security status.

62. The method of claim 48 further comprising:

receiving a status request from said global operations center;
in response to receiving said status request, transmitting said security status from the agent to the master control unit; and
retransmitting said security status from the master control unit to the global operations center.

63. The method of claim 48 further comprising the master control unit interrogating the agent to determine a security status of the asset.

64. The method of claim 48 wherein processing the security status comprises:

generating a report from the received security status; and
transmitting the report to an appropriate official.

65. The method of 48 and further comprising creating a wireless network between a plurality of said agents for sharing security status.

66. The method of claim 65 and further comprising assigning a one of said plurality of the agents as a primary agent for transmitting said security status and location from said plurality of the agents to said master control unit.

67. The method of claim 48 wherein said asset is a fixed asset, the method further comprising:

interfacing an existing security device to said master control unit, and
said existing security device sending a signal to said master control unit when said security device detects a security threat.

68. The method of claim 67 further comprising:

installing a plurality of the agents within said fixed assets; and
each one of said agents monitoring a security of an area within said fixed asset.

69. The method of claim 68 further comprising:

installing a plurality of the agents around an exterior perimeter of said fixed asset;
each one of said agents monitoring a security of an area of said periphery of said fixed asset.

70. A method for tracking a security status of a plurality of assets, said method comprising:

providing a plurality of agents, each one of said plurality of agents connected to one of said plurality of assets;
each of said plurality of agents monitoring a security of a connected asset and providing a security data associated with said connected asset;
creating a wireless network between a plurality of agents for sharing said security data;
providing a master control unit, said master control unit including a receiver for receiving said security data;
determining which of said plurality of agents primarily transmits said shared security data to said master control unit;
at said determined primary agent, compiling the shared security data of the plurality of agents; and
transmitting the compiled shared security data from the determined primary agent to the master control unit.

* * * * *